US012785474B2

(12) United States Patent
Mansir

(10) Patent No.: US 12,785,474 B2
(45) Date of Patent: Nov. 3, 2026

(54) ROTOR MODULES AND ASSEMBLIES FOR PERMANENT MAGNET MOTOR FOR ESP

(71) Applicant: Halliburton Energy Services, Inc., Houston, TX (US)

(72) Inventor: Hassan Mansir, Frimley (GB)

(73) Assignee: Halliburton Energy Services, Inc., Houston, TX (US)

( * ) Notice: Subject to any disclaimer, the term of this patent is extended or adjusted under 35 U.S.C. 154(b) by 168 days.

(21) Appl. No.: 18/884,369

(22) Filed: Sep. 13, 2024

(65) Prior Publication Data

US 2026/0081490 A1 Mar. 19, 2026

(51) Int. Cl.
*H02K 1/278* (2022.01)
*E21B 43/12* (2006.01)
(Continued)

(52) U.S. Cl.
CPC ............... *H02K 1/278* (2013.01); *H02K 1/30* (2013.01); *H02K 7/083* (2013.01); *H02K 15/03* (2013.01);
(Continued)

(58) Field of Classification Search
CPC ........ E21B 43/128; H02K 1/278; H02K 1/28; H02K 1/30; H02K 15/03; H02K 2201/06; H02K 2213/12; H02K 5/132; H02K 7/083
See application file for complete search history.

(56) References Cited

U.S. PATENT DOCUMENTS 9,893,578 B2 2/2018 Clingman et al.
11,962,193 B2 4/2024 Curt et al.
(Continued)

FOREIGN PATENT DOCUMENTS

CN 211046590 U 7/2020
CN 113014007 A 6/2021
(Continued)

OTHER PUBLICATIONS

Translation CN115313716 (Year: 2022).*
(Continued)

*Primary Examiner* — Christopher M Koehler
*Assistant Examiner* — Ethan Nguyen Vo
(74) *Attorney, Agent, or Firm* — Conley Rose, P.C.; Rodney B. Carroll

(57) ABSTRACT

Improvements to electrical motors are disclosed. For example, a rotor assembly for an ESP motor can include a plurality of rotor modules, each configured to be disposed about and rotationally coupled to a drive shaft and each comprising a plurality of permanent magnets, with each rotor module being skewed with respect to one or more other of the plurality of rotor modules. Another approach for providing skew may be using a rotor module having a plurality of rotor module subsections, each configured to be disposed about a drive shaft and each comprising a plurality of permanent magnets, with each rotor module subsection being skewed with respect to one or more other of the plurality of subsections and coupled together to form a rotor module having inherent skew. In some embodiments, inherently skewed rotor modules may also be skewed with respect to one another. Related systems and methods are also disclosed.

21 Claims, 16 Drawing Sheets

(51) Int. Cl.
*H02K 1/30* (2006.01)
*H02K 7/08* (2006.01)
*H02K 15/03* (2025.01)

(52) U.S. Cl.
CPC ........ *E21B 43/128* (2013.01); *H02K 2201/06* (2013.01)

(56) References Cited

U.S. PATENT DOCUMENTS

2014/0117791 A1 5/2014 Fiseni et al.
2021/0351645 A1* 11/2021 Tanner .................. H02K 1/278

FOREIGN PATENT DOCUMENTS

CN 115313716 A * 11/2022 ............. H02K 1/276
JP 2008271652 A 11/2008

OTHER PUBLICATIONS

Foreign Communication from Related Application—International Search Report and Written Opinion of the International Searching Authority, International Application No. PCT/US2024/050352, dated Jun. 10, 2025, 10 pages.

* cited by examiner

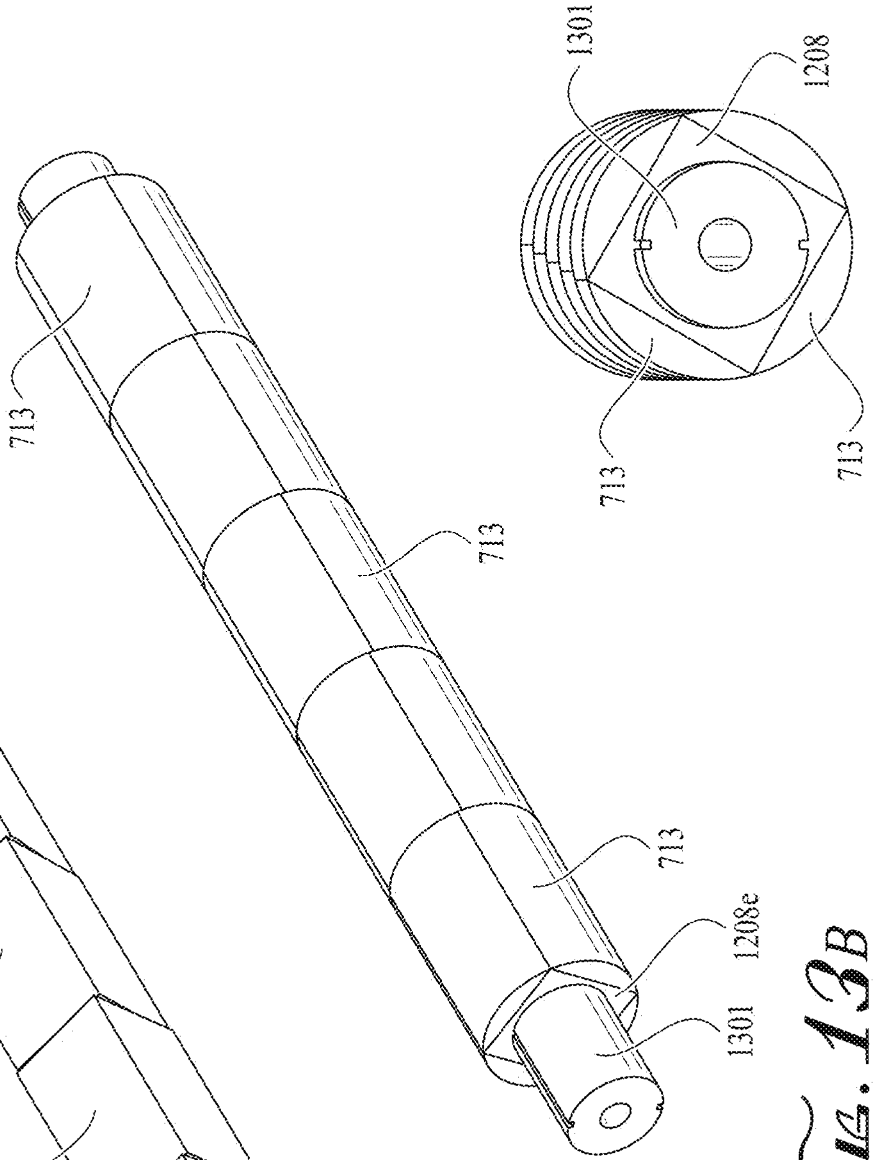
FIG. 13C
FIG. 13B
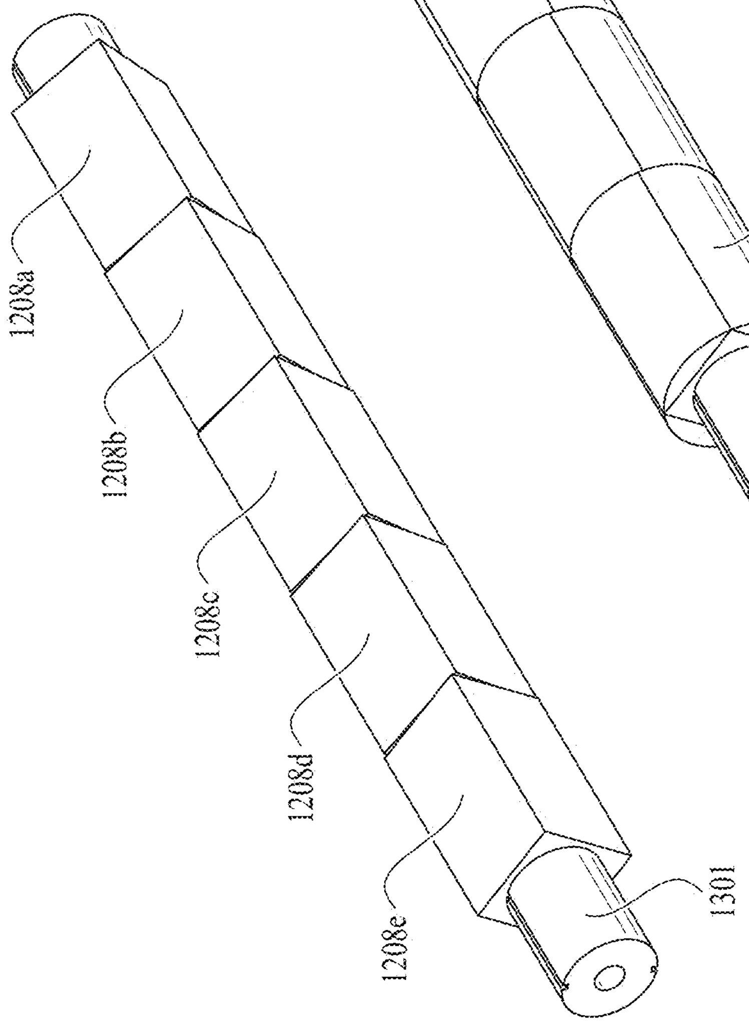
FIG. 13A

ROTOR MODULES AND ASSEMBLIES FOR PERMANENT MAGNET MOTOR FOR ESP

CROSS-REFERENCE TO RELATED APPLICATIONS

None.

STATEMENT REGARDING FEDERALLY SPONSORED RESEARCH OR DEVELOPMENT

Not applicable.

FIELD

This disclosure relates generally to the field of pumping. More particularly, this disclosure relates to the field of electrical submersible pumps for use downhole in a well. Still more particularly, this disclosure relates to downhole motors of the sort which may be used in electrical submersible pumps, which are formed using rotor modules, and to systems and methods for skewing such rotor assemblies and/or rotor modules.

BACKGROUND

Electrical submersible pump (ESP) assemblies are used to artificially lift fluid to the surface, for example in deep wells such as oil or water wells. ESP assemblies are commonly used in the oil and gas industry to extract fluids from underground reservoirs. By way of example, the artificial lift provided by ESP assemblies may be useful in situations when the reservoir does not have sufficient pressure to allow the well to naturally produce, or when an additional boost to production of the well is desired. Improvements to ESP assemblies can improve overall production of fluids from a well, which may thereby improve the profitability of the well. Improvements in the construction and assembly of the ESP and/or its component parts may result in lower ESP costs and/or in improved characteristics (such as performance, durability or life).

A typical ESP assembly comprises, from bottom to top, an electric motor, a seal unit, a pump intake, and a pump (e.g. typically a centrifugal pump), which are all mechanically connected together with shafts and shaft couplings. The electric motor supplies torque to the shafts, which provide power to the pump. The electric motor is isolated from a wellbore environment by a housing and by the seal unit. In some embodiments, the seal unit can act as an oil reservoir for the electric motor. For example, the oil can function both as a dielectric cooling fluid and as a lubricant for the bearings in the electric motor. The seal unit also may provide pressure equalization between the electric motor and the wellbore environment.

The pump is configured to transform mechanical torque received from the electric motor via a drive shaft to fluid pressure which can lift fluid up the production tubing. For example, a centrifugal pump typically has rotatable impellers within stationary diffusers. A shaft extending through the centrifugal pump is operatively coupled to the motor through the seal section, and the impellers of the centrifugal pump are rotationally coupled to the shaft. In use, the motor can rotate the shaft, which in turn can rotate the impellers of the centrifugal pump relative to and within the stationary diffusers, thereby imparting pressure to the fluid within the centrifugal pump. The electric motor is generally connected to a power source located at the surface of the well, for example using a cable and a motor lead extension. The ESP assembly can be placed into the well and usually is disposed inside a well casing. In a cased completion, the well casing separates the ESP assembly from the surrounding formation. In operation, perforations in the well casing allow well fluid to enter the well casing and flow to the pump intake for transport to the surface.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIGS. 13A-E illustrate an exemplary method for forming a rotor module embodiment using a plurality of exemplary rotor module subsections, for example similar to that of FIG. 12A, according to an embodiment of the disclosure.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As used herein, orientation terms "upstream," "downstream," "up," and "down" are defined relative to the direction of flow of well fluid in the well casing. "Upstream" is directed counter to the direction of flow of well fluid, towards the source of well fluid (e.g., towards perforations in well casing through which hydrocarbons flow out of a subterranean formation and into the casing). "Downstream" is directed in the direction of flow of well fluid, away from the source of well fluid. "Down" is directed counter to the direction of flow of well fluid, towards the source of well fluid. "Up" is directed in the direction of flow of well fluid, away from the source of well fluid.

Disclosed embodiments relate generally to improved techniques for forming/assembling rotor assemblies. More specifically, disclosed embodiments may relate to rotor assemblies for an ESP motor (e.g. for use with a pump to form an ESP assembly for use downhole in a well to pump formation fluids from the well formation to the surface), and to improved systems and methods relating to such rotor assemblies.

Figure 1:
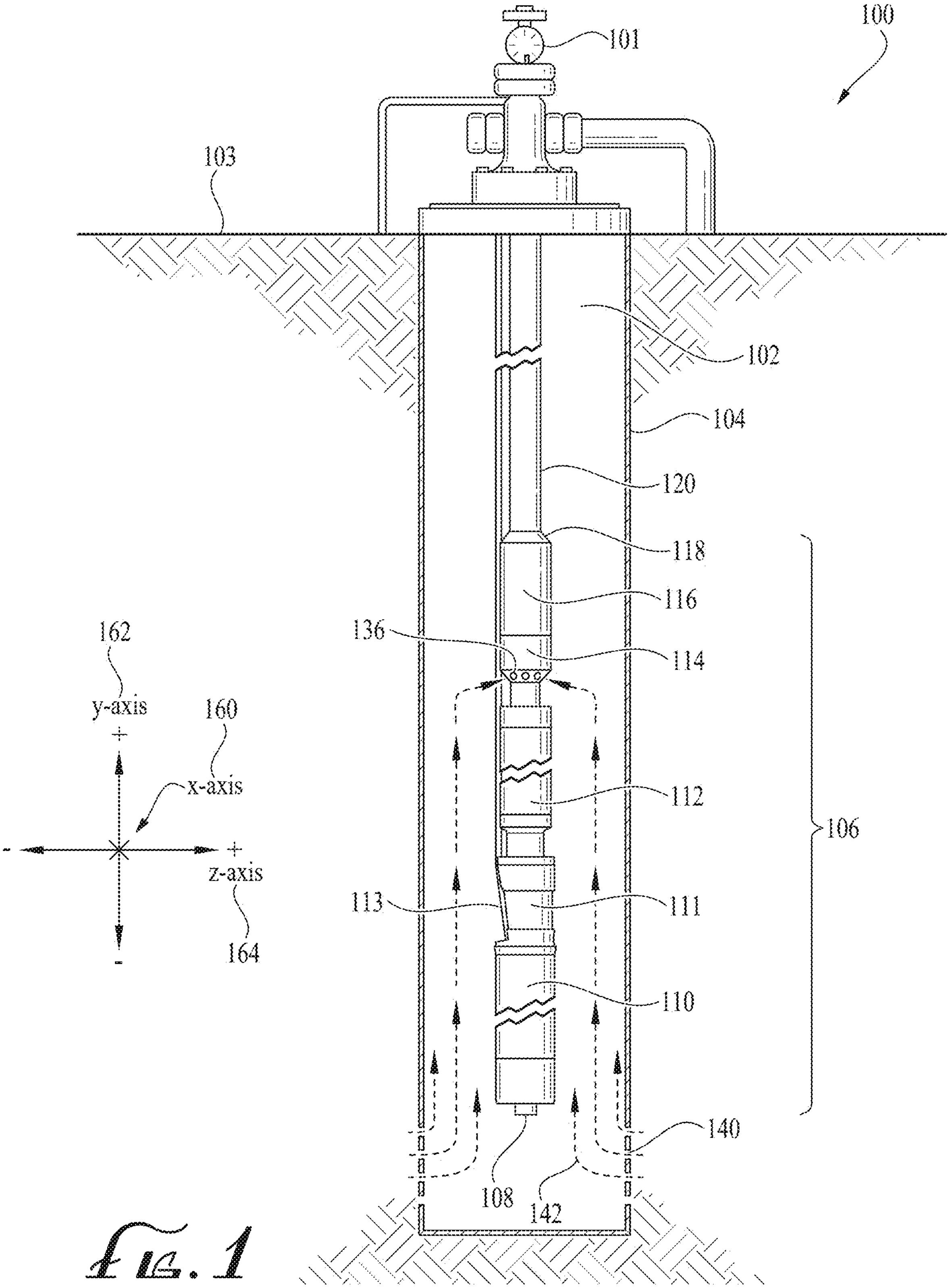
FIG. 1 is a schematic illustration of an exemplary electrical submersible pump (ESP) assembly disposed in a wellbore, according to an embodiment of the disclosure.

Turning now to FIG. 1, an exemplary producing well environment 100 is described. In an embodiment, the environment 100 comprises a wellhead 101 above a wellbore 102 located at the surface 103. A casing 104 is provided within the wellbore 102. For convenience of reference, FIG. 1 provides a directional reference comprising three coordinate axes—an X-axis 160 where positive displacements along the X-axis 160 are directed into the sheet and negative displacements along the X-axis 160 are directed out of the sheet; a Y-axis 162 where positive displacements along the Y-axis 162 are directed upwards on the sheet and negative displacements along the Y-axis 162 are directed downwards on the sheet; and a Z-axis 164 where positive displacements along the Z-axis 164 are directed rightwards on the sheet and negative displacements along the Z-axis 164 are directed leftwards on the sheet. In the embodiment of FIG. 1, the Y-axis 162 is approximately parallel to a central axis of a vertical portion of the wellbore 102.

An exemplary electrical submersible pump (ESP) assembly 106 is deployed downhole in a well within the casing 104 and comprises an optional sensor unit 108, an electric motor 110 which may include a motor head 111, a seal unit 112, an electric power cable 113, a pump intake 114, a centrifugal pump 116, and a pump discharge 118 that couples the centrifugal pump 116 to a production tubing 120. The centrifugal pump 116 is operatively coupled to the seal section and to the motor 110 by a shaft (not shown). In an embodiment, the ESP assembly 106 may employ thrust bearings in several places, for example in the electric motor 110, in the seal unit 112, and/or in the centrifugal pump 116. While not shown in FIG. 1, in an embodiment, the ESP assembly 106 can comprise a gas separator that may employ one or more thrust bearings. The motor head 111 couples the electric motor 110 to the seal unit 112. The electric power cable 113 may connect to a source of electric power at the surface 103 (not shown) and to the electric motor 110, for example being configured to provide power from the source of electric power at the surface 103 to the electric motor 110.

In operation, the casing 104 is pierced by perforations 140, and reservoir fluid 142 flows through the perforations 140 into the wellbore 102. The fluid 142 flows downstream in an annulus formed between the casing 104 and the ESP assembly 106, is drawn into the pump intake 114, is pumped by the centrifugal pump 116, and is lifted through the production tubing 120 to the wellhead 101 to be produced at the surface 103. The fluid 142 may comprise hydrocarbons such as oil and/or gas, water, or both hydrocarbons and water.

While the example illustrated in FIG. 1 relates to land-based subterranean wells, similar ESP systems can be used in a subsea environment and/or may be used in subterranean environments located on offshore platforms, drill ships, semi-submersibles, drilling barges, etc. And while the wellbore is shown in FIG. 1 as being approximately vertical, in other embodiments, the wellbore may be horizontal, deviated, or any other type of well. Also, while the pump of the ESP is described with respect to FIG. 1 as a centrifugal pump, other types of pumps (e.g. a progressive cavity pump, any other type of pump suitable for the system, or combinations thereof) may be used instead.

Figure 2:
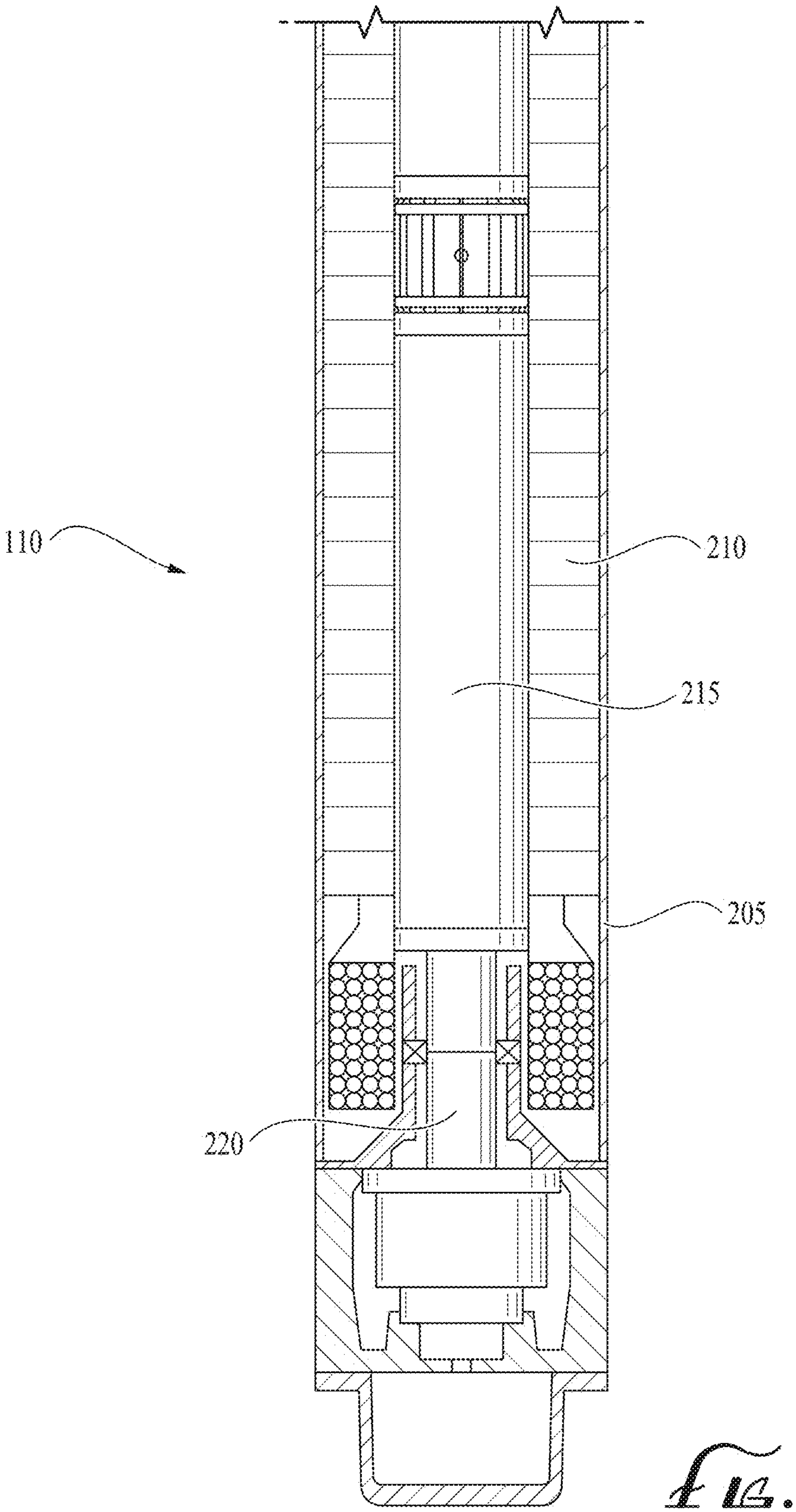
FIG. 2 is a cross-sectional view of an exemplary motor for the electrical submersible pump assembly of FIG. 1, according to an embodiment.
Figure 3:
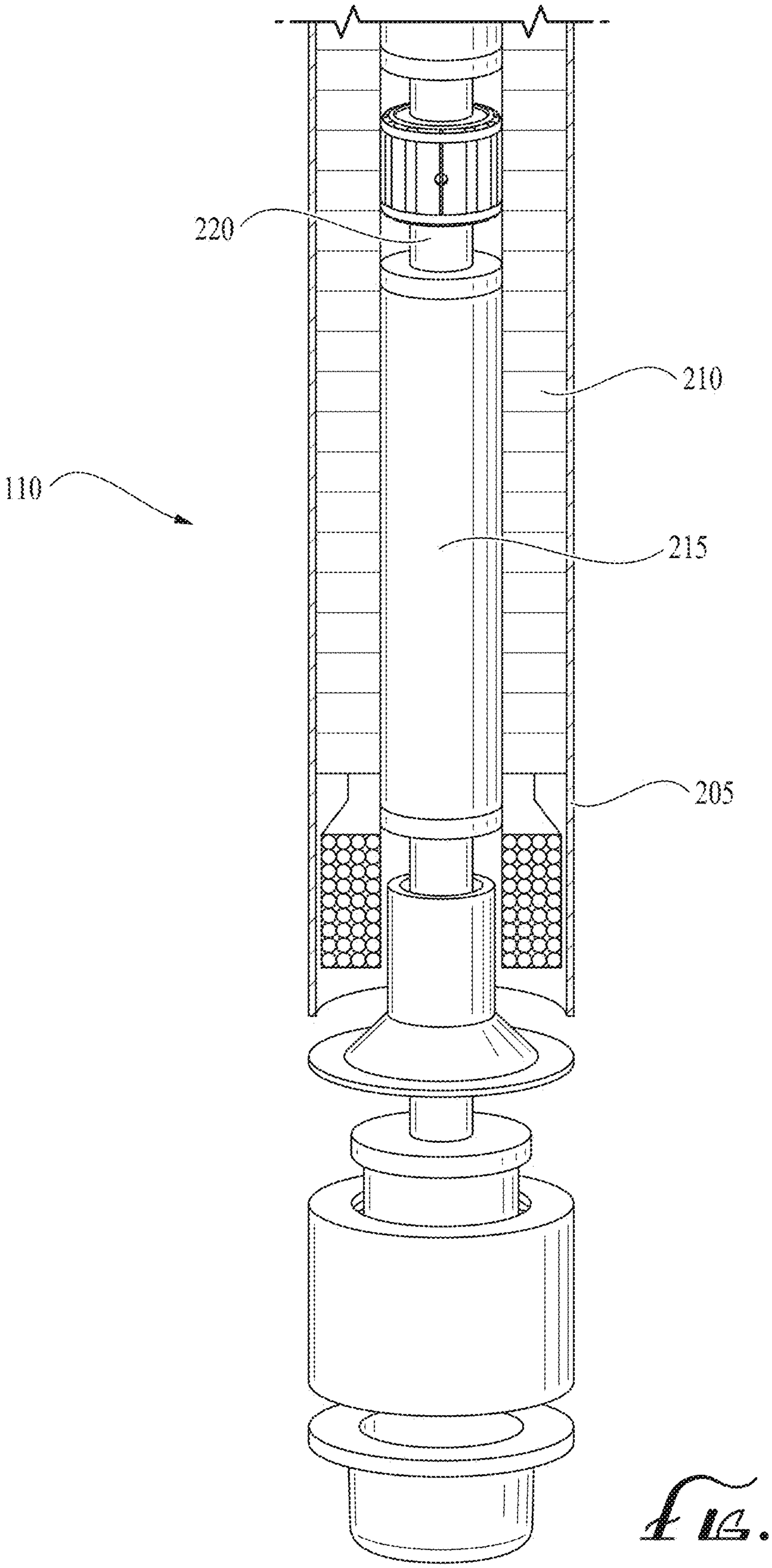
FIG. 3 is an exploded isometric view of the motor of FIG. 2, according to an embodiment of the disclosure.

As shown in FIGS. 2-3, an exemplary motor 110 of the ESP assembly includes a housing 205, a stator 210, a rotor 215 (which may in some embodiments be a rotor assembly), and a drive shaft 220. The housing 205 typically comprises a hollow cylinder or tube and is configured to protect the internal components of the motor 110 from the external environment. The stator 210 also typically comprises a hollow cylinder and is secured to the housing 205 (e.g. to the inner surface of the housing 205) so as to be stationary within the housing 205. Typically, the stator 210 comprises a plurality of laminations, which may be thin sheets of electrical steel, wrapped by a plurality of electrically conductive windings. When energized, the windings can generate a rotating magnetic field for interaction with the rotor 215 to generate torque and induce rotation of the rotor 215. The rotor 215 also typically comprises a hollow cylinder and is concentrically arranged between the stator 210 and the drive shaft 220, for example with the drive shaft 220 typically extending longitudinally along the centerline of the motor 110, the rotor 215 disposed around the drive shaft 220, and the stator 210 disposed around the rotor 215, within the housing 205. The rotor 215 is rotatable within the stator 210 and secured to the drive shaft 220, such that rotation of the rotor 215 drives the drive shaft 220. In embodiments, the motor 110 may be a two or more pole motor, a three-phase squirrel cage induction motor, a permanent magnet motor (PMM), a hybrid PMM, or other motor configuration.

Figure 4:
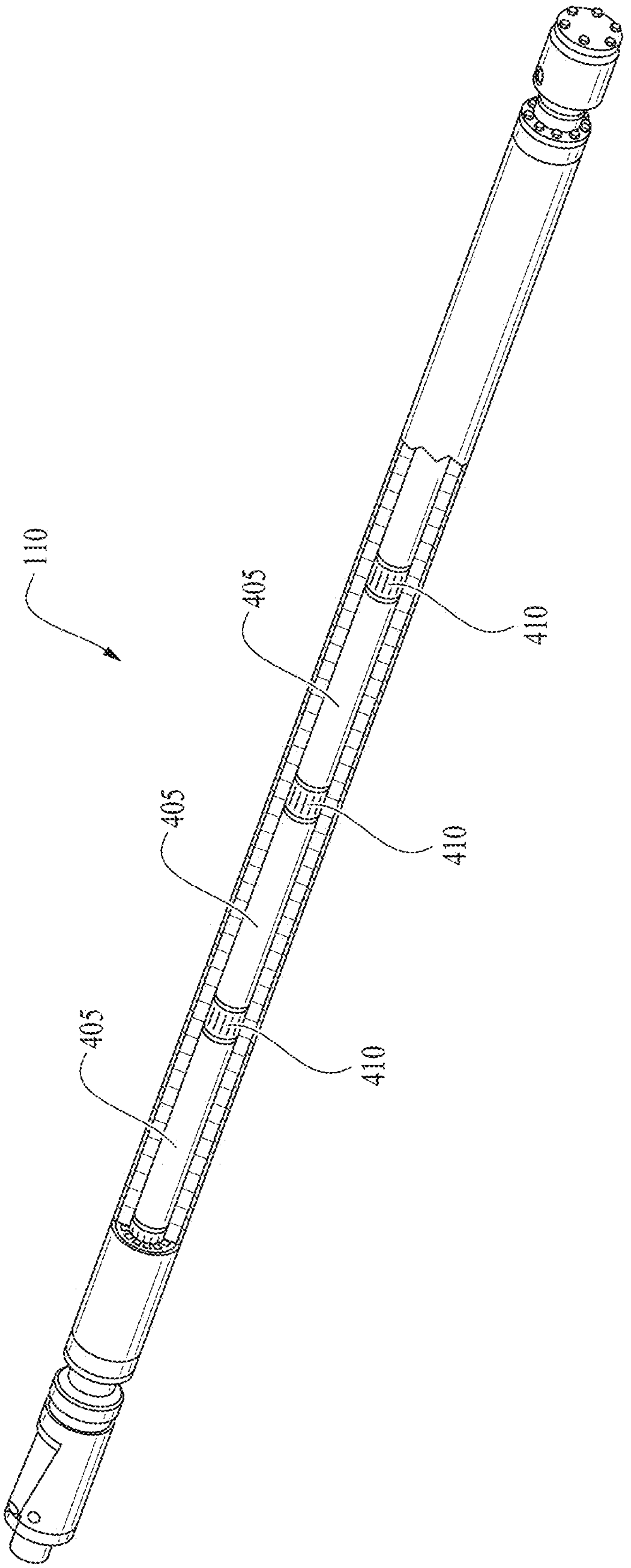
FIG. 4 is a partial cut-away isometric view of an exemplary ESP motor having a plurality of rotor modules with rotor bearing assemblies therebetween, according to an embodiment of the disclosure.

The rotor 215 can be an assembly which typically includes a number of rotor modules, which together jointly form the rotor assembly 215 for the motor 110, with each rotor module secured to the drive shaft 220. The number of modules can depend on the power requirement of the application. The rotational magnetic field of the stator 210 when energized can induce rotation of the rotor 215, and thereby the drive shaft 220, with the drive shaft 220 transmitting rotational torque from the motor 110 to the pump 116. As shown in FIG. 4, the rotor modules 405 (jointly forming the rotor 215) are spaced apart from each other along the drive shaft 220, with a rotor bearing assembly 410 typically located between adjacent rotor modules 405. Rotor bearing assemblies 410 can also be located at the top of the uppermost rotor module 405 and/or the bottom of the lowermost rotor module 405 (e.g. at the top and bottom of the rotor). In some embodiments, the rotor bearing assembly 410 can be a hydrodynamic bearing assembly. Each rotor bearing assembly 410 is configured to support the rotor 215 at predefined axial positions to maintain correct radial alignment of the drive shaft 220 during motor operation.

Figure 5:
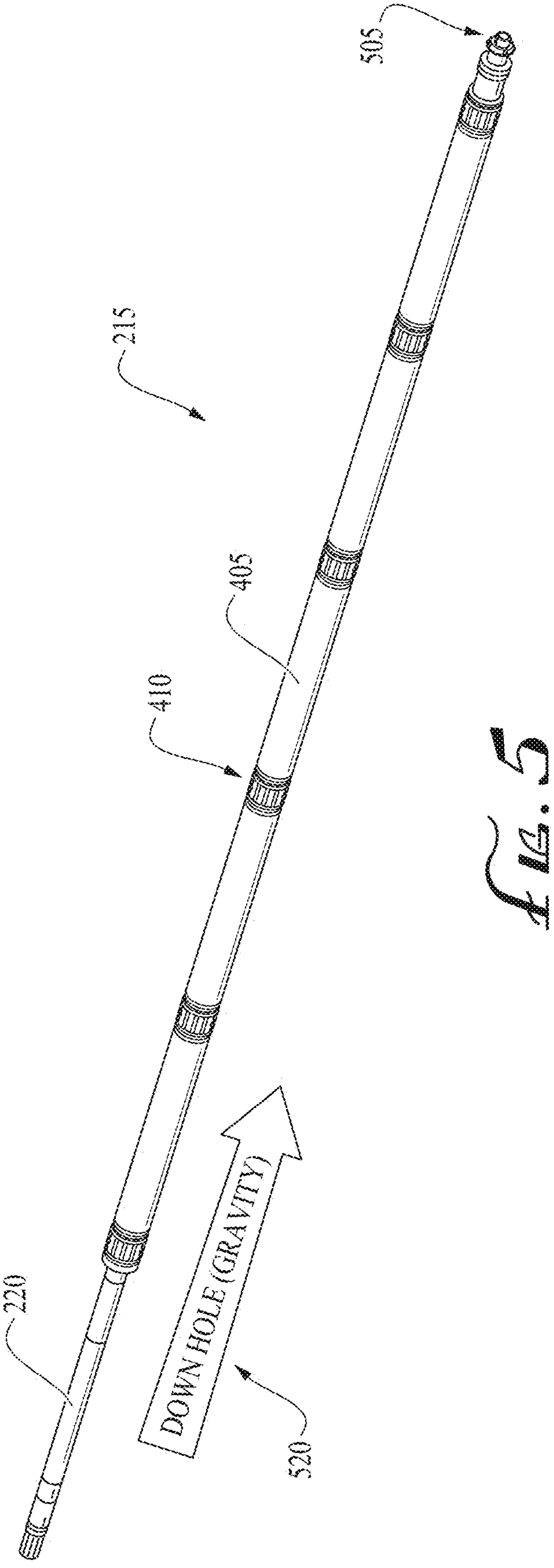
FIG. 5 is an isometric view of an exemplary rotor assembly for an ESP motor of an ESP pump assembly, according to an embodiment of the disclosure.

FIG. 5 illustrates a typical rotor assembly 215 of an electric motor 110 (for example, of an ESP assembly). In embodiments, the electric motor 110 can be a permanent magnet motor. Typically, the rotor assemblies 215 shown in the figures belong to such a permanent magnet motor (PMM). However, alternate embodiments may include an electric motor of any conventional type, i.e. an induction motor or a hybrid PMM containing elements of both permanent magnet and induction motors. The rotor assembly 215 of the PMM utilizes permanent magnets to generate the electromagnetic field, compared to induction motors where the magnetic field is generated by inducing a current in the rotor interconnected bars (e.g. rotor/cage bars), which may be made from copper.

A rotor assembly 215 embodiment can comprise a single drive shaft 220, a plurality of magnetic rotor modules 405, and a plurality of radial hydrodynamic bearing assemblies 410. Typically, a bearing assembly 410 can be disposed between adjacent rotor modules 405. In embodiments, the rotor assembly 215 can also include a pre-loading mechanism 505 (as shown in FIG. 5), which can provide thermal expansion compensation for the rotor assembly 215. In the embodiment shown in FIG. 5, the pre-loading mechanism 505 is disposed at the non-drive end (e.g. the motor base) of the rotor assembly 215, and it can be configured to act against the gravitational load 520 created by all the rotor modules 405 and journal bearing assemblies 410 installed on the shaft 220 (as well as addressing differential thermal expansion, for example). Alternatively, or in conjunction, the pre-loading mechanism 505 can be positioned at the drive end (e.g. the motor head) of the shaft 220, according to other embodiments.

Figure 6:
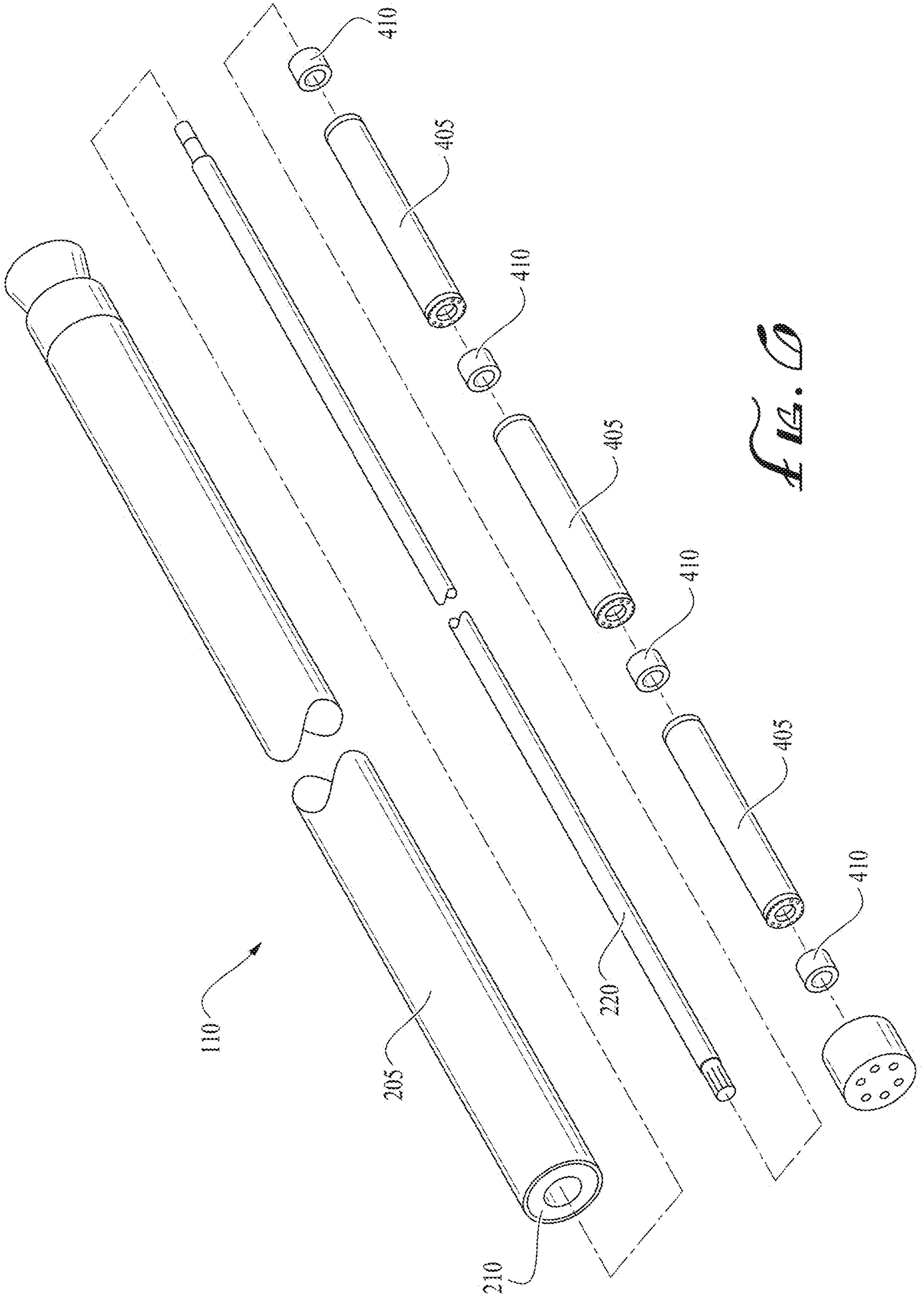
FIG. 6 is an isometric view of another ESP motor embodiment having a plurality of rotor modules, according to an embodiment of the disclosure.

FIG. 6 depicts some of the components of an exemplary motor 110 for use in an ESP. In an embodiment, the motor 110 may include a drive shaft 220 that is mechanically coupled to a plurality of rotor modules 405, and this assembly can be inserted into a stator 210. The stator 210 of FIG. 6 is retained within a housing 205. In embodiments, the plurality of rotors modules 405 may be coupled to the drive shaft 220 with a bearing 410 (such as a journal bearing assembly) disposed between adjacent rotor modules. For example, the plurality of rotor modules 405 may be supported on the shaft 220 by a plurality of journal bearings 410.

Figure 7A:
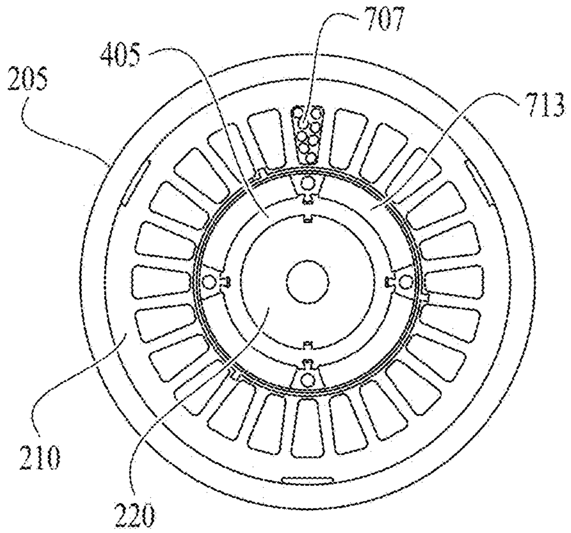
FIGS. 7A-E illustrate via cross-sectional view exemplary motor embodiments, each having different exemplary rotor module configurations disposed around the shaft and within the stator, according to an embodiment of the disclosure.
Figure 7B:
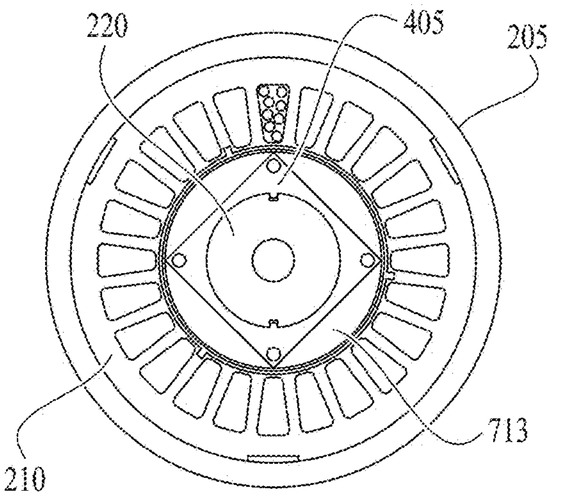
Figure 7C:
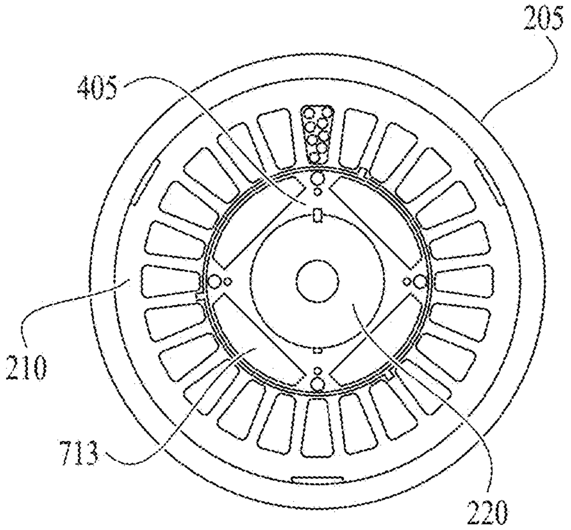
Figure 7D:
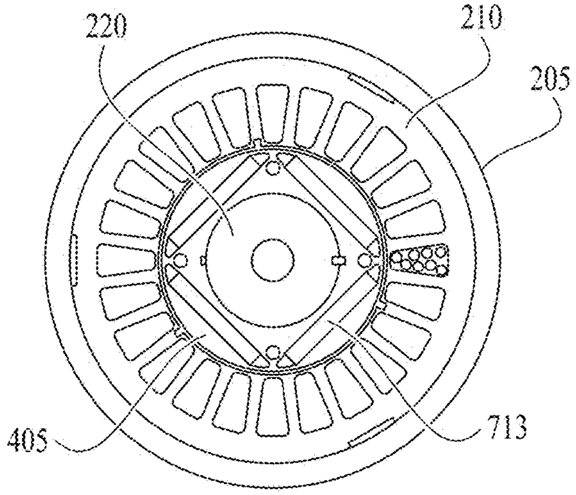
Figure 7E:
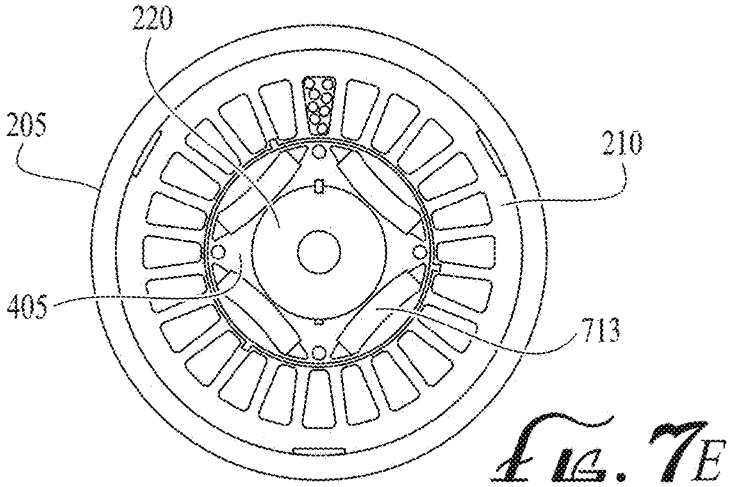

FIGS. 7A-E illustrate via cross-section exemplary motor embodiments, each having different exemplary rotor module 405 configurations disposed around the shaft 220 and within the stator 210, according to an embodiment of the disclosure. Various configurations of Permanent Magnet Motor rotors of the sort that can be used in ESP applications are shown. In each configuration, the rotor (e.g. rotor modules 405, which each may comprise a plurality of permanent magnets 713 disposed around the shaft 220) is shown located around the shaft 220 (with the rotor module 405 and the shaft 220 configured to rotate together, for example due to rotationally interlocking key-keyway), the stator 210 is located around the rotor module 405 (with the rotor module 405 being configured to rotate freely within the stator 210), and the casing/housing 205 is located around the stator 210. Purely for illustrative purposes to assist in understanding, the motor windings 707 of the stator 210 are shown in one slot for illustration purposes only (e.g. understanding that typically each slot of the stator lamination may have similar windings). FIGS. 7A-B illustrate rotor configurations known as surface-mount design and can be made with curved magnets 713 (as in FIG. 7A) or breadloaf magnets 713 (as in FIG. 7B). FIGS. 7C-E illustrate alternative embodiments in which the magnets 713 are disposed within internal pockets (e.g. known as internal permanent magnet construction), for example in a magnetic carrier or lamination stack. FIG. 7C, illustrates breadloaf magnets 713, FIG. 7D illustrates block magnets 713, and FIG. 7E illustrates inwardly curved magnets 713, by way of example.

Figure 8A:
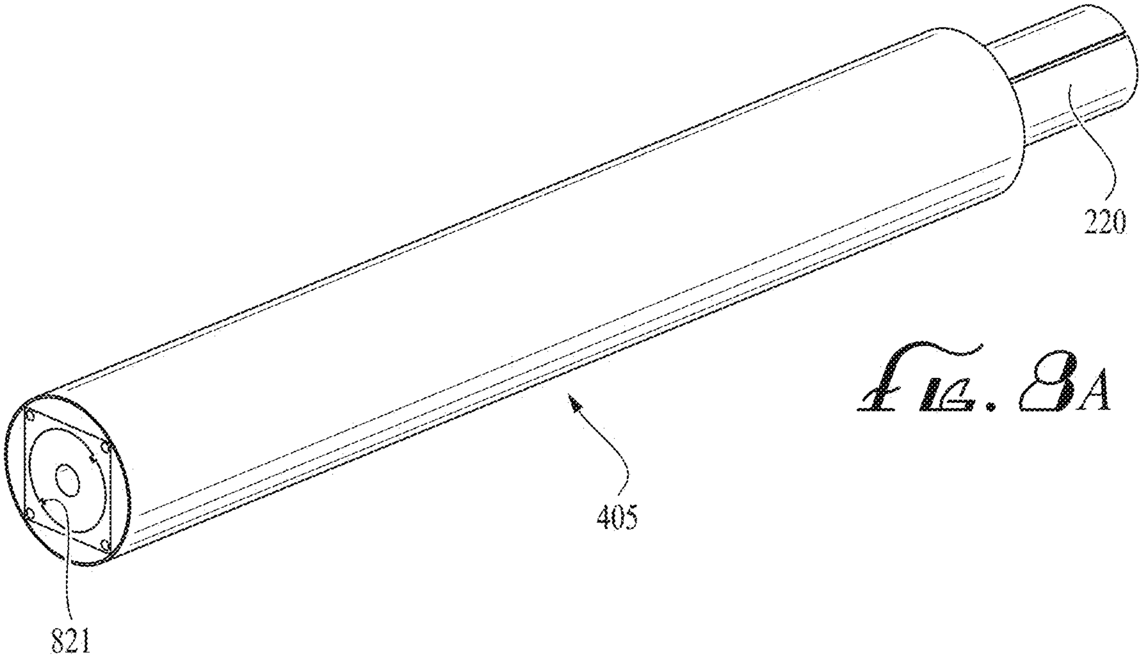
FIG. 8A is an isometric view of an exemplary rotor module, according to an embodiment if the disclosure.
Figure 8B:
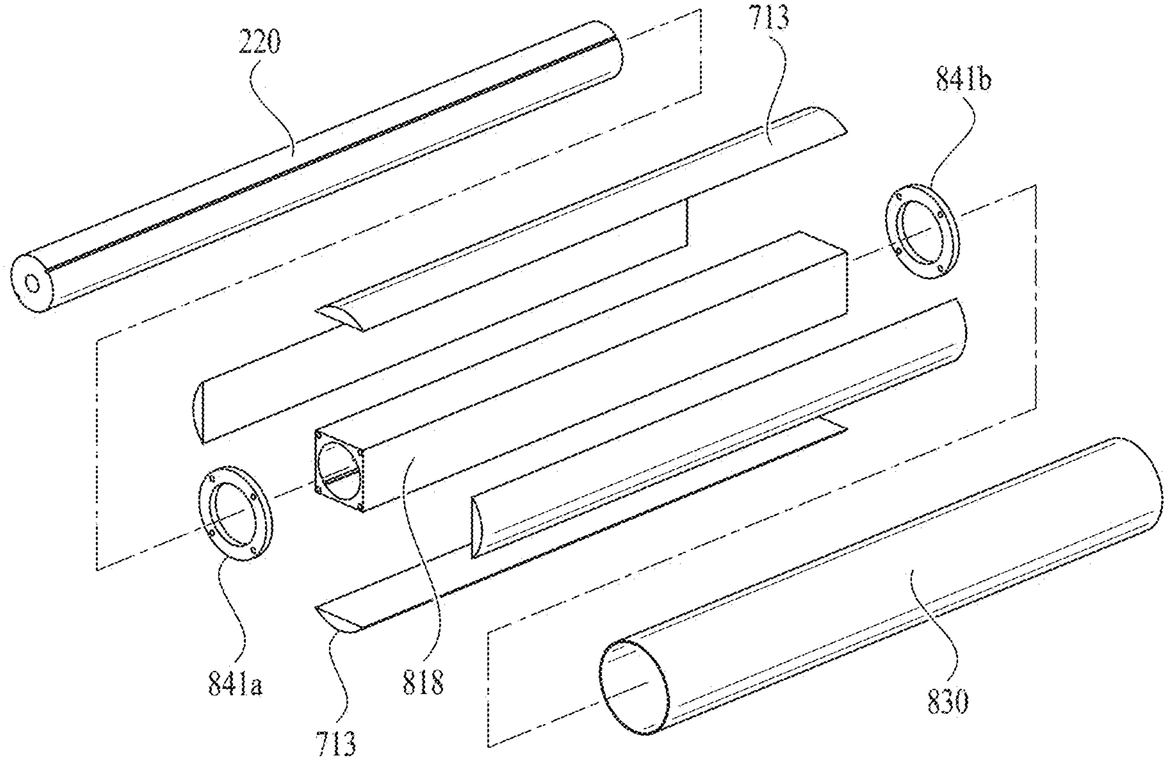
FIG. 8B is an exploded view of the rotor module of FIG. 8A, according to an embodiment of the disclosure.

FIGS. 8A-B illustrate an exemplary rotor module 405 having permanent magnets 713. While FIG. 8A illustrates an embodiment with magnet configuration similar to FIG. 7B, alternate embodiments may be similar to FIG. 7A (or any other surface mount configuration), and still other alternate embodiments may use internal permanent magnet construction. In FIGS. 8A-B, a magnetic carrier 818 may be configured to be disposed around the shaft 220. Typically, the magnetic carrier 818 may be configured to rotate with the shaft 220 (e.g. the carrier 818 may be rotationally fixed to the shaft 220), even if in some embodiments the carrier 818 may be configured to move axially with respect to the shaft 220 (e.g. to allow the carrier 818 to be slid into position onto the shaft 220, for example during rotor 215 assembly). In embodiments, the carrier 818 may be a solid element (e.g. not laminated and/or without pockets) with a bore therethrough (e.g. for the shaft 220) and a rotational connection mechanism 821 disposed in the bore (e.g. configured to rotationally fix the carrier 818 to the shaft 220). In some embodiments, the carrier 818 may comprise or be formed of magnetic material, such as carbon steel. The plurality of magnets 713 can then be mounted on the carrier 818, and may be retained in place on the carrier 818 (for example by a retaining sleeve 830). In some embodiments, the magnets 713 may each extend substantially the length of the rotor module 405 and/or the carrier 818.

In FIGS. 8A-B the magnets 713 can be mounted on the magnetic carrier 818 (which may be configured to locate the magnets 713 around the shaft 220) and supported/retained in place on the carrier 818 by the sleeve 830. In some embodiments, the sleeve 830 may comprise or be composed of non-magnetic material, such as Inconel (e.g. a nickel-chromium superalloy, for example comprising nickel, chromium, iron and a selection of other metals such as cobalt, manganese, copper, niobium, and/or tantalum) or carbon fiber. In some embodiments, the sleeve 830 may comprise or be composed of stainless steel such as 316, and the assembly may be thermally press fitted to ensure thermal expansion during operation would not impact the contact area between the magnets 713 and the sleeve 830. FIG. 8B also illustrates end rings 841*a* and 841*b*, which may be disposed on either axial end of the rotor module 405 and/or may protect the end of the magnets 713 and/or provide a stop for the sleeve 830. End rings 841*a* and 841*b* may also be used for rotor balancing purposes, for example by either adding weights in dedicated holes or remove weight by drilling. For illustration purposes, a section of the shaft 220 is shown. In FIGS. 8A-B, the shaft 220 can include a keyway or slot extending substantially the entire length of the shaft 220, and the carrier 818 for the rotor module 405 can include a corresponding key extending substantially the entire length of the carrier 818 and/or rotor module 405 (e.g. the portion of the rotational connection mechanism 821 on the carrier 818 may extend substantially the length of the rotor module 405). Interaction of the key with the keyway may allow for the rotor module 405 to be inserted (e.g. slid) into position axially on the shaft 220, while fixing the rotor module 405 and the shaft 220 rotationally (e.g. so that the rotor module 405 and the shaft 220 rotate together).

Figure 9A:
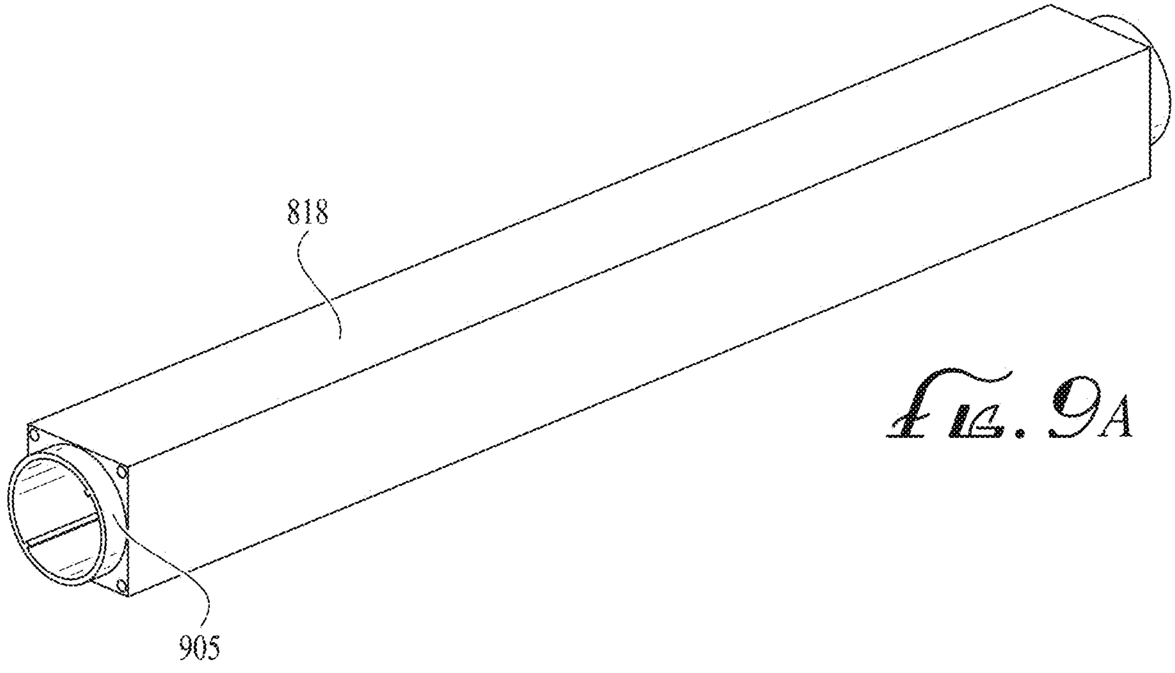
FIG. 9A is an isometric view of an alternate magnetic carrier for an exemplary rotor module, according to an embodiment of the disclosure.
Figure 9B:
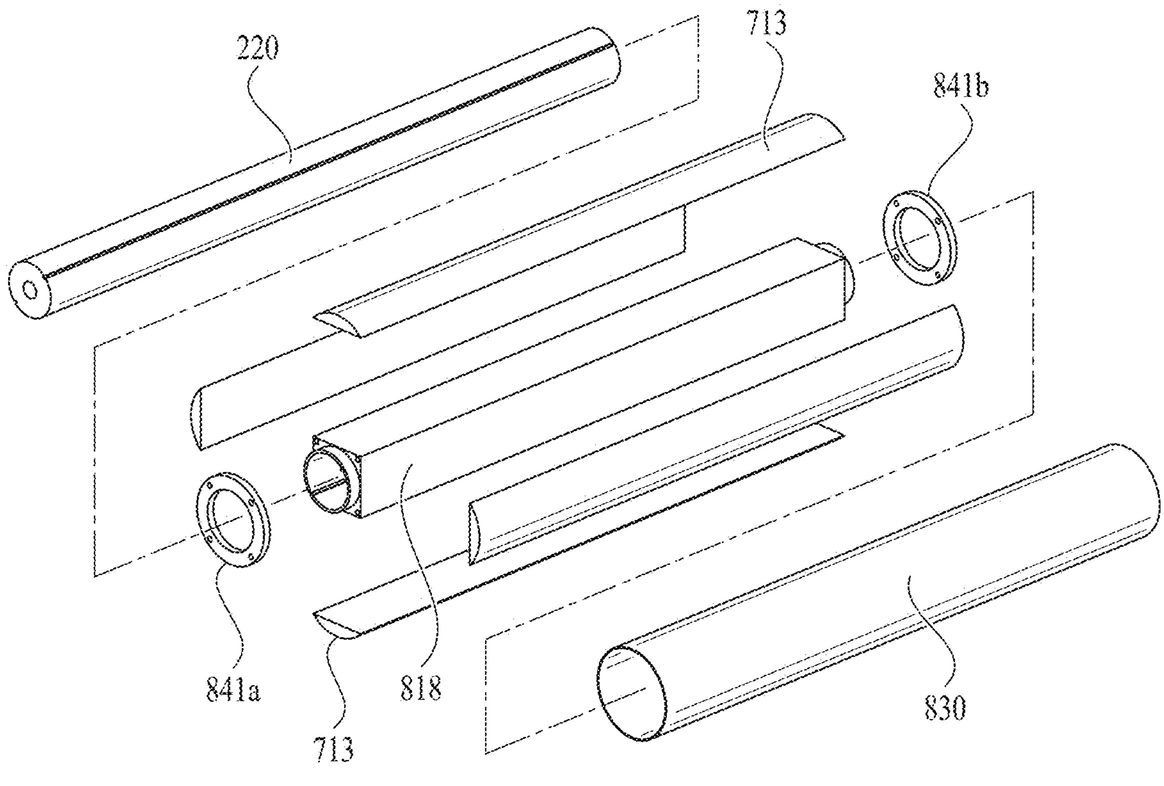
FIG. 9B is an exploded isometric view of an alternate rotor module using the magnetic carrier of FIG. 9A, according to an embodiment of the disclosure.

FIG. 9A illustrates an alternate carrier 818 embodiment, which may be used in a rotor module 405 similar to that of FIG. 8A (see for example FIG. 9B) and which may include an extension at each end 905 that can be configured to support the end rings 841*a, b* and/or to ensure a positive position for locating the journal bearing on the shaft 220 as shown in FIG. 6. By disposing a plurality of rotor modules 405 onto the shaft 220 (e.g. with the corresponding key and keyway rotationally fixing the carrier 818 and the shaft 220), typically with a bearing disposed between adjacent rotor modules 405, a rotor assembly 215 may be formed.

Skewing of rotors in motors can have significant benefits, for example in relation of enhancing the profile of their Back-EMF, reducing the magnitude of cogging torque and torque ripple under load. For example, using skew can reduce the harmonics in the motor Back-EMF, making it more of a true sine-wave motor which may be more compatible with PWM (e.g. pulse width modulation) based VFDs (e.g. variable frequency drives), for example having sinewave filter fitted. Furthermore, the ability to skew the rotors can enable compensation for shaft torsion under load. So, operations may be enhanced by recovering the lost power due to the shaft torsion while maintaining the benefit of the skew, and/or effectively introducing skew to the rotor assembly 215 can achieve enhanced performance for the motor, as well as compensation to shaft torsion under load conditions.

Despite advantages that may be provided by such a skew, it has been conventionally difficult to provide desire skew in ESP motors due to their diameter to length ratio. Disclosed embodiments can use a modular approach to introduce skew more easily, while also enhancing the manufacturing process and minimizing assembly and handling challenges. For example, PMM rotor embodiments can be of surface mount configuration (e.g. where the magnets 713 are bonded and/or disposed on a magnetic hub or carrier 818, for example similar to FIGS. 7A-B). In embodiments, the magnets 713 can be manufactured in near shape, for example by a sintering process. In embodiments, the magnets 713 may be held in place (e.g. on the carrier 818) using a thin containment or retainer sleeve 830, which may be formed of non-magnetic material such as stainless-steel, carbon fiber, or Inconel in some embodiments. The magnets 713 can be mounted on the carrier 818, which may for example be of solid construction (e.g. a single unitary piece, without laminations) using a magnetic material such carbon steel. A plurality of such rotor modules 405 may be located on the motor shaft 220 between journal bearings, forming a single rotor assembly 215 of multiple rotor modules 405 stacked together on the motor shaft 220. (e.g. without direct connection between rotor modules). Typically, a single shaft 220 runs through all rotor modules 405 of the rotor assembly 215. In embodiments, the desired skew can be built into the carrier 818, for example by rotating the location of the keyway (or key, depending on which aspect of the rotational connection mechanism 821 is disposed on the shaft 220) between modules 405 of the rotor assembly 215. By way of example, a recommended skew may be one stator slot over the length of the motor (e.g. one stator slot over the length of the rotor assembly 215). By combining a variety of rotor modules with specific skew, it can be possible to achieve the desired skew for any motor application.

For example, a 100HP motor may have a single, continuous stator 210, a single continuous shaft 220, and a rotor assembly 215 comprising five rotor modules 405 skewed relative to one another. The five rotor modules 405 may be disposed in a stack on the shaft 220, for example with bearings disposed between adjacent rotor modules 405, and the rotor modules 405 may each be keyed to rotate with the shaft 220. The stator 210 may be disposed around all of the five rotor modules 405, with the five rotor modules 405 disposed between the stator 210 and the shaft 220. Such a 100 HP motor might have an axial length of approximately two meters. Similarly, a 200 HP motor may have a single, continuous stator 210, a single continuous shaft 220, and a rotor assembly 215 comprising ten rotor modules 405 skewed relative to one another. The ten rotor modules 405 may be disposed in a stack on the shaft 220, for example with bearings disposed between adjacent rotor modules 405, and the rotor modules 405 may each be keyed to rotate with the shaft 220. The stator 210 may be disposed around all of the ten rotor modules 405 of the rotor assembly 215, with the ten rotor modules 405 disposed between the stator 210 and the shaft 220. Such a 200 HP motor might have an axial length of approximately four meters. Thus, the horsepower of the motor may be configured in this manner based on the number of rotor modules 405 used in the rotor assembly 215. Such stacking of rotor modules 405 to form rotor assemblies for ESP motors might occur up to approximately 400 HP, or in some embodiments up to approximately 500 HP, for example with operations requiring more than approximately 400 HP then using a plurality of motors. A modular approach can effectively provide a single motor with desired horsepower, rather than linking multiple separate motors together, and this single motor approach may have improved reliability (e.g. since mechanical and electrical coupling of separate motors together may introduce reliability concerns).

In some embodiments, the rotor assembly 215 may comprise a plurality of rotor modules 405 which are skewed relative to one another. The general formulae for the angle between rotor modules (e.g. the amount of skew between rotor modules ("ASBRM")) can be set forth as follows:

$$ASBRM = n \cdot \frac{360}{N_S \cdot (N_m - 1)}$$

Where: n is the skew in stator slots, typically 1 or 2

$N_S$ is the number of stator slots $N_m$ is the number of rotor modules

Applying this formula to an example based on 24 slot stators, 5 rotor modules and 1 slot skew, the angular displacement between rotor modules 405 forming a rotor assembly (e.g. ASBRM) can be 1×360/(24*(5−1))=3.75°. So for example, the rotor module key's location angles can be set to be 0° for the first rotor module 405, 3.75° for the second module 405 (e.g. with 3.75° between the first and second modules), 7.5° for the third module 405 (e.g. with 3.75° between the second and third modules), 11.25° for the fourth module 405 (e.g. with 3.75° between the third and fourth modules), and 15° for the fifth module (e.g. with 3.75° between the fourth and fifth modules).

Figure 10:
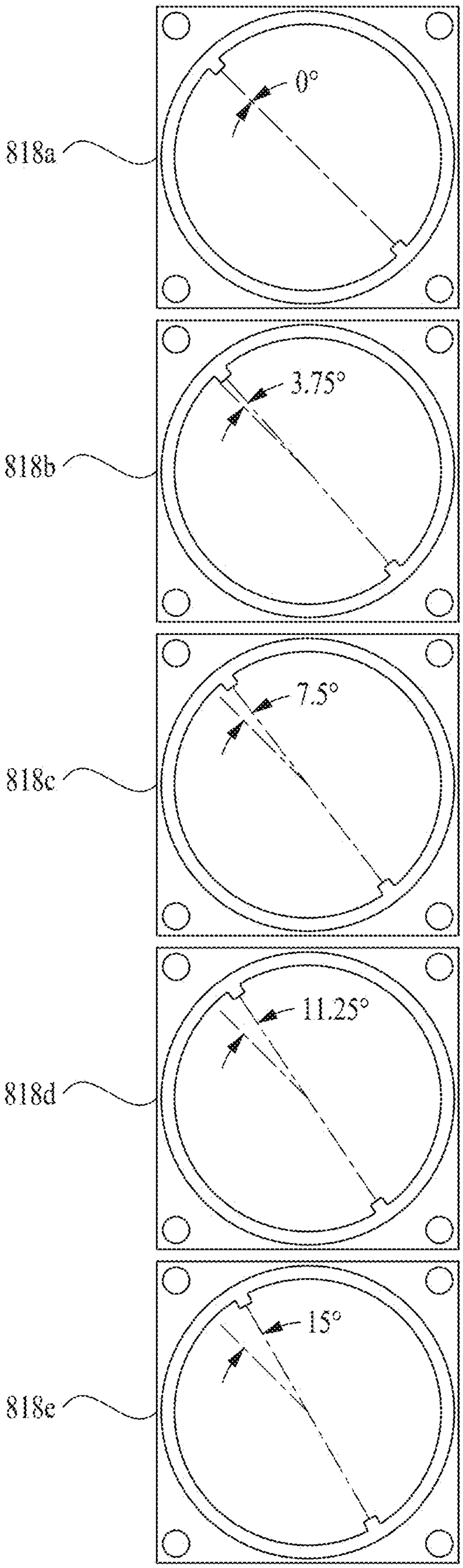
FIG. 10 illustrates a set of exemplary rotor module magnetic carriers configured to provide skew when used together to form a rotor module assembly, according to an embodiment of the disclosure.

In some embodiments, the skewing of rotor modules 405 may be accomplished based on the location of the rotational connection mechanism 821 (e.g. the key or keyway used to rotationally couple the rotor module 405 to the shaft 220), which may be used to alter the angular position of the magnetic carriers 818 of the plurality of rotor modules 405 to provide skew (e.g. by angular offset of rotational degrees). For example, FIG. 10 illustrates the magnetic carriers 818*a-e* of five exemplary rotor modules 405 forming a set for a rotor assembly 215, where the keys used to locate the rotor module 405 on the shaft 220 are disposed (e.g. machined or broached) in the carrier 818 at various angles to ensure that a skew between the rotor modules 405 when incorporated in the rotor assembly 215. As an example, a 4 pole 24 slot stator design may have a skew angle that is a multiple of slot pitch in mechanical degrees, for example 1 or 2 times the slot pitch (e.g. which is in this case 360/24=15). In some embodiments, 1 slot pitch may be selected as the desired skew, and for example on a 5-rotor assembly 215, the rotor keys can be set to be 0°, 3.75°, 7.5°, 11.25° and 15°. FIG. 10 shows five exemplary carriers 818*a-e* for five related rotor modules 405 with the various location of the keys to provide such skew. While the keys are shown in FIG. 10 as integral part of the carrier 818, this concept is also applicable when a keyway is disposed on the carrier 818 to locate a dedicated key (e.g. on the shaft 220), or with any other applicable rotational connection mechanism 821.

Figures 11A, 11B:
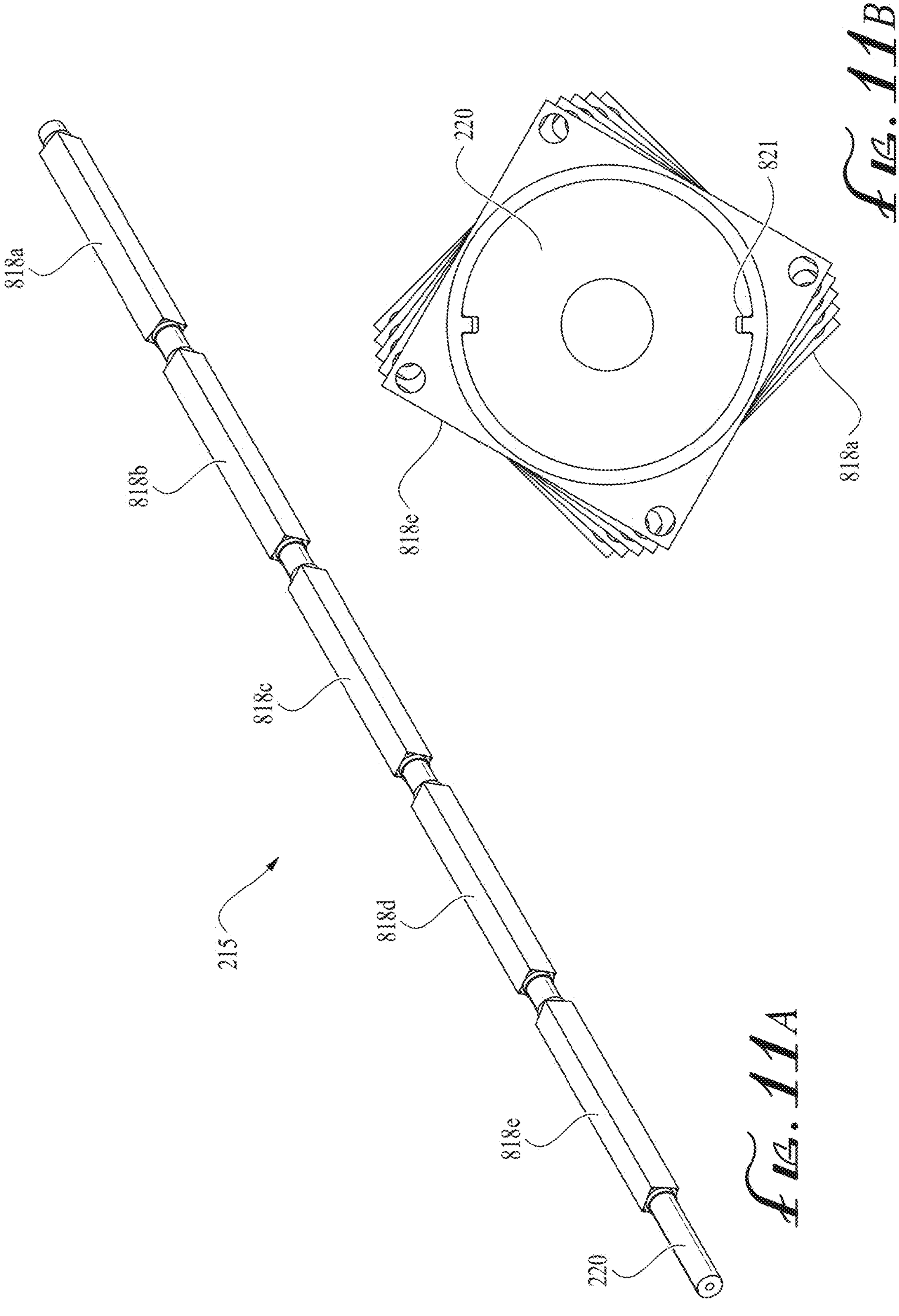
FIG. 11A is an isometric view of an exemplary rotor module assembly using the plurality of rotor module magnetic carriers of FIG. 10 (e.g. showing only the magnetic carriers mounted on the shaft, for clarity), according to an embodiment of the disclosure.
FIG. 11B is an end view of the embodiment of FIG. 11A, illustrating skew between various rotor modules (e.g. as provided by the magnetic carriers of FIG. 10), according to an embodiment of the disclosure.
Figure 11C:
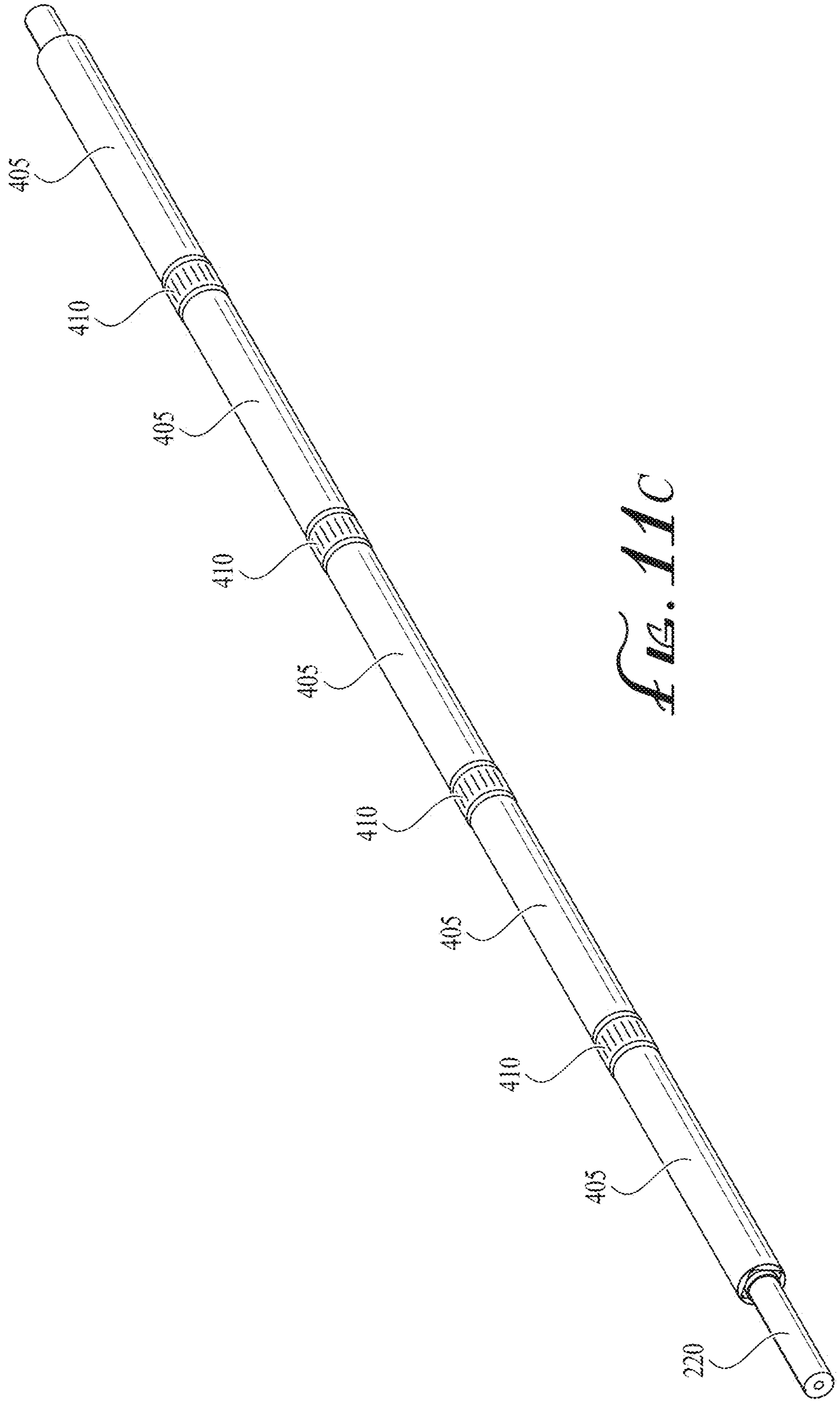
FIG. 11C is an isometric view of the exemplary rotor module assembly of FIG. 11A in its entirety (e.g. with each rotor module further including magnets and a retaining sleeve disposed about the magnetic carrier), according to an embodiment of the disclosure.

FIGS. 11A-C illustrates an exemplary rotor assembly 215 disposed on a shaft 220, for example using the set of carriers 818*a-e* of FIG. 10 to provide skew to the rotor assembly 215. Five modules 405 (e.g. using the carriers 818*a-e* of FIG. 10) can be assembled on the shaft 220 as a typical illustration of the skewing approach. For simplicity, only the magnet carriers 818 of the rotor modules 405 are shown in FIGS. 11A-B, since this makes illustration of the skew between rotor modules 405 more apparent. In FIG. 11A, the modules (e.g. the carriers 818*a-e*) are assembled in sequence (e.g. so that there is an equal amount of skew between each adjacent pair of rotor modules 405, for example 3.75 degrees). However, in alternate embodiments, the rotor modules 405 can be assembled in any sequence (e.g. the effectiveness in providing skew to the rotor assembly 215 may not be sequence dependent (e.g. regardless of the order of stacking of the rotor modules 405 on the shaft 220), so long as the skew is provided by the set of rotor modules 405). In some embodiments, so long as the set of rotor modules 405 is configured to provide the desired amount of skew, the specific assembly sequence/axial location of any of the rotor modules 405 of the set of rotor modules (see for example FIG. 10) forming the rotor assembly 215 may not be fixed/required, while the skewing effect may still be produced (e.g. there may be no impact on the performance of the skewing effect).

For a more complete illustration, FIG. 11C illustrates the rotor assembly 215 of FIG. 11A in its entirety (e.g. with the carriers 818 disposed on the shaft 220, the magnets 713 disposed on the carrier 818, and the retaining sleeve 830 disposed around the magnets 713, such that the plurality of rotor modules 405 are disposed on the shaft 220). Typically, all the rotor modules 405 forming a rotor assembly 215 may be substantially similar (e.g. as shown in FIG. 11C, differing only by the amount of skew), but in other embodiments the rotor modules 405 may differ. While skewing is illustrated in FIGS. 11A-C with respect to surface mount rotor modules and/or breadloaf magnets 713, the same skewing approach may be similarly used for other module types (e.g. internally mounted magnets 713 and/or other magnet shapes). However, the surface mount approach of FIGS. 11A-C may be particularly beneficial, for example for ease of assembly. In FIG. 11C, the skew of the magnetic carriers 818 can result in skew of the corresponding magnets 713 (not shown here).

The discussion above (e.g. with respect to FIGS. 10-11C) relates to skewing rotor modules 405 with respect to one another (e.g. the skew is accomplished at the module level). In alternate embodiments, the skewing can be implemented (either entirely or in addition to module level skewing) at the level of individual rotor modules 405 (e.g. with one or more rotor module 405 having inherent and/or internal skew), for example using rotor modules 405 which are built with subsections (e.g. submodules). For example, the subsections jointly forming a rotor module 405 may be skewed with respect to one another, providing a rotor module 405 with inherent internal skew. Many of the concepts discussed with respect to skewing rotor modules 405 to form a skewed rotor assembly 215 may similarly be applicable with respect to rotor modules 405 with inherent skew, and are hereby incorporated. FIGS. 12-14 illustrate such an inherent-skew approach.

Figure 12A:
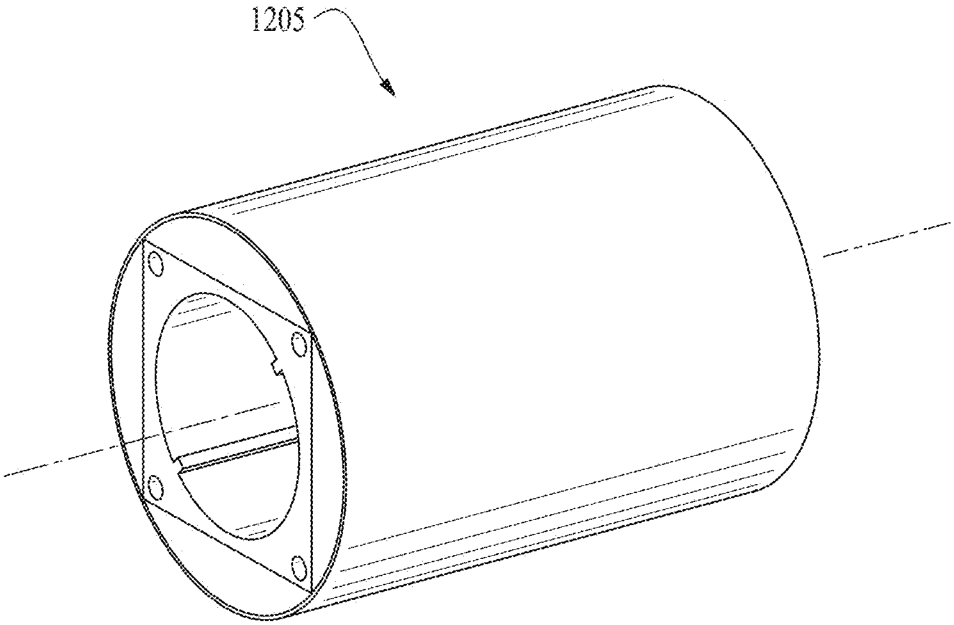
FIG. 12A is an isometric view of an exemplary rotor module subsection, according to an embodiment of the disclosure.

For example, each rotor module 405 may be conceptually split into a plurality of subsections which can be skewed relative to each other. In this manner, a rotor module 405 may be constructed by assembling a plurality of rotor module subsections together into a single integrated rotor module. By skewing one or more of the subsections (and in many embodiments, all of the rotor module subsections would be skewed relative to one another), the assembled rotor module 405 may have inherent and/or internal skew. FIG. 12A illustrates an exemplary rotor module subsection 1205, which may in some embodiments be similar in construction to the elements and arrangement discussed with respect to rotor modules (e.g. similar to FIG. 8), but which may have an axial length less than (e.g. some portion of) that of the entire rotor module 405. For example, rotor modules 405 may typically have an axial length of approximately 340-460 mm, while rotor module subsections 1205 may typically be a portion of that length (for example depending on the number of subsections 1205 making up the rotor module 405—e.g. a rotor module 405 having two subsections 1205 would have subsections each with an axial length of approximately half the axial length of the overall rotor module 405, while a rotor module 405 having five subsections would have subsections each with an axial length of approximately ⅕ the axial length of the overall rotor module 405, and a rotor module 405 having ten subsections would have subsections 1205 each with an axial length of approximately 1/10 the axial length of the overall rotor module 405). In some embodiments, each rotor module subsection 1205 may have an axial length of approximately 68-92 mm or approximately 70-90 mm.

Figure 12B:
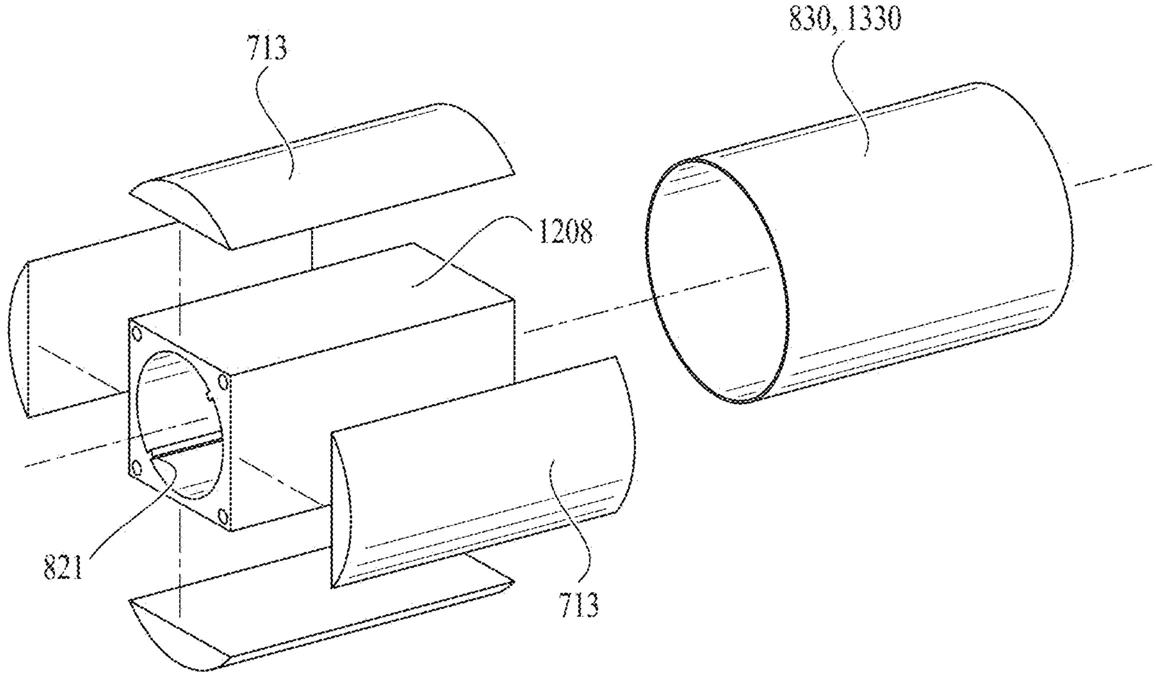
FIG. 12B is an exploded view of the rotor module subsection of FIG. 12A, according to an embodiment of the disclosure.

FIG. 12B illustrates assembly of an exemplary rotor module subsection 1205. For example, the permanent magnets 713 may be disposed on the exterior of a hub 1208 (e.g. which may be shorter but similar to the carrier 818 of FIG. 8, for example, using a surface mount approach), and a sleeve 830 (which may in some embodiments be a portion of a longer sleeve 1330, as discussed below) may hold the magnets 713 in place on the hub 1208. The rotor module subsection 1205 (e.g. as illustrated in FIG. 12A) may serve as the building block for the rotor module assembly (e.g. a rotor module 405 formed of a plurality of subsections 1205), for example as discussed below. In some embodiments, a single sleeve 1330 may encompass all of the rotor module subsections 1205, holding the magnets 713 of each subsection 1205 in place on their respective hubs 1208 while also holding the subsections 1205 together as an integrated rotor module 405 (e.g. a whole rotor module 405 that can stand independently without being held together by the shaft 220, such that the rotor module 405 can be slid onto the shaft 220 during rotor assembly). In other embodiments, each rotor module subsection 1205 may have its own sleeve 830 (e.g. to hold the magnets 713 to the corresponding hub 1208), and the subsections 1205 may otherwise be joined together into a whole (e.g. with a longer sleeve 1330 encompassing all of the rotor module subsections). In still other embodiments, the magnets 713 may be held to the hub 1208 using alternate means (e.g. adhesive, mechanical attachment, etc.), and either a single outer sleeve 1330 or some other attachment mechanism (e.g. adhesive, mechanical attachment, etc.) can be used to couple the rotor module subsections 1205 together axially.

By skewing the orientation of the various rotor module subsections 1205 with respect to one another, skew may be incorporated integrally within a rotor module 405. For example, the hubs 1208 of a set of rotor module subsections 1205 may include skew in a similar manner as discussed above with respect to skewing of rotor modules (e.g. in FIGS. 10-11C), for example based on the positioning of the rotational connection mechanism 821 (e.g. the key or keyway location on the interior of the hub 1208). For example, the exterior surface (e.g. magnet orientation surfaces) of the hub 1208 may be identical for all subsections 1205 forming the rotor module 405, so that angular translation of the rotational connection mechanism 821 can act to skew the position of the magnets 713. For example, the rotational connection mechanism may be skewed (e.g. have an angular displacement) with respect to the magnet orientation surfaces of the hub 1208, with the amount of such skew varying for different subsections 1205 (e.g. the exterior surface of the hubs 1208 of the various subsections 1205 may be formed to provide specific skew/angular displacement to the magnets 713 associated with each subsection 1205). In some embodiments, the angle between the rotational connection mechanism 821 and the magnet orientation surfaces may vary between subsections 1205, thereby providing the skew. In embodiments, the key or keyway of the hub 1208 may extend substantially the entire length of the hub 1208 and/or rotor module subsection 1205. By skewing the hubs 1208 of the subsections 1205 forming the rotor module 405, the location of the magnets 713 may be skewed (e.g. between subsections 1205 of an exemplary rotor module 405).

Similar to the discussion above regarding skewing of rotor modules, the rotor module subsections 1205 can be assembled in sequence (e.g. so that there is an equal amount of skew between each adjacent pair of rotor module subsections, for example 3.75 degrees for 5 sub-sections rotor module assembly), or alternatively the rotor module subsections 1205 can be assembled in any sequence (e.g. with the sequence of stacking not matching the sequence of skew, so long as the set of subsections 1205 forming the rotor module 405 includes the correct amount of skew). Typically, all of the rotor module subsections 1205 forming a rotor module 405 may be substantially similar (e.g. as shown in FIGS. 13A-D, differing only by the amount of skew), but in other embodiments the rotor module subsections 1205 may differ.

Figure 13D:
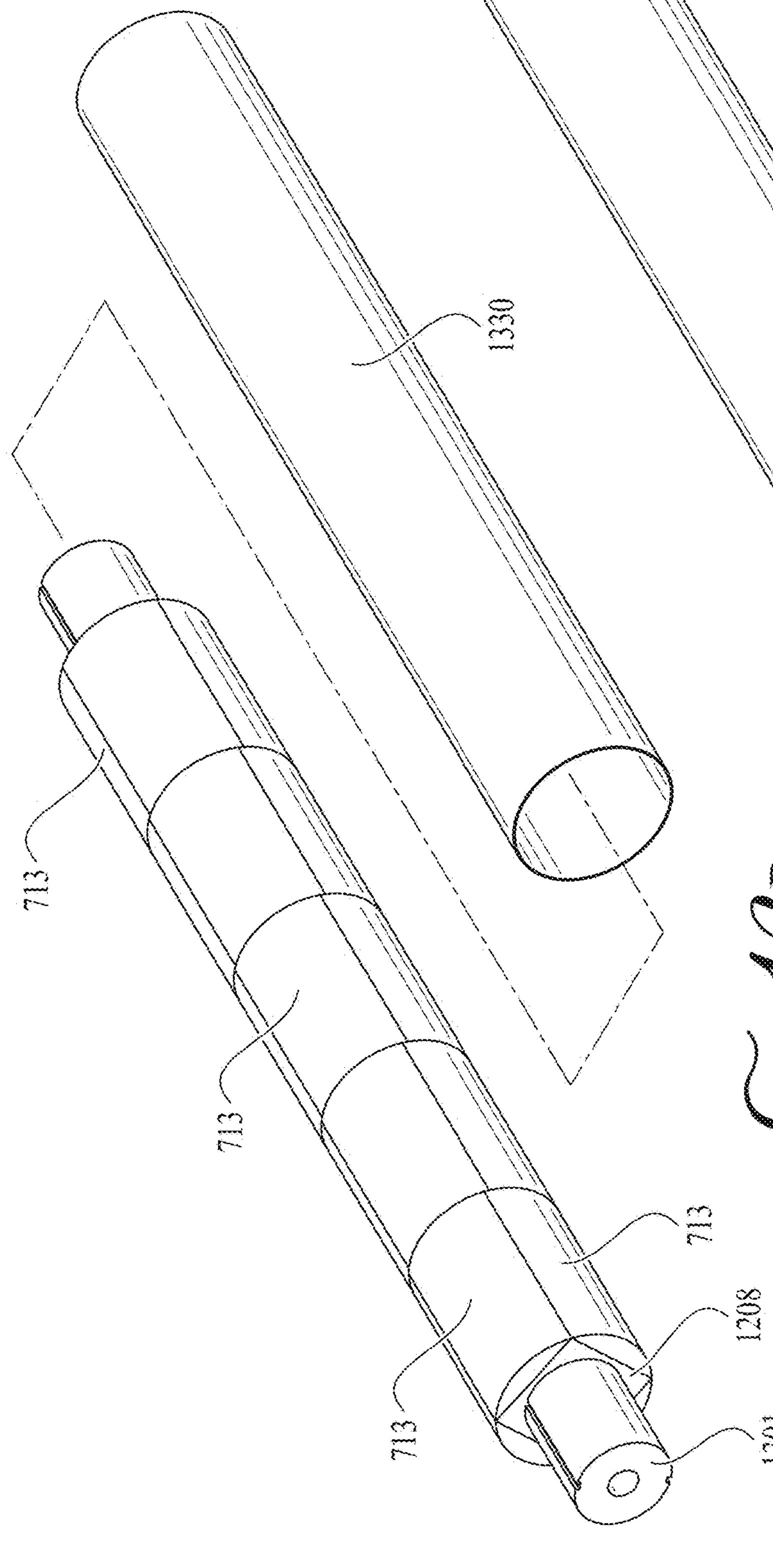

FIGS. 13A-E illustrate an exemplary approach for forming a rotor module 405 having inherent skew using a plurality of rotor module subsections 1205 (e.g. with each rotor module subsection 1205 similar to that of FIG. 12A). The illustrative example of FIG. 13A is applied to a 4 pole 24 slot stator, the rotor module 405 is split into 5 subsections 1205, and each subsection 1205 is skewed relative to each other by approximately 3.75 degrees. The general formulae for the angle (e.g. amount of skew) between subsections ("ASBS") can be set forth as follows:

$$ASBS = n \cdot \frac{360}{N_S \cdot (N_m - 1)}$$

Where: n is the skew in stator slots, typically 1 or 2

$N_S$ is the number of stator slots $N_m$ is the number of module subsections

Applying this formula to the example above (e.g. 3.75° is based on 24 slot stators, 5 rotor modules and 1 slot skew), the angular displacement between subsections 1205 forming a rotor module can be 1×360/(24*(5−1))=3.75°. So for example, the rotor subsection key's location angles can be set to be 0° for the first subsection, 3.75° for the second subsection (e.g. with 3.75° between the first and second subsections), 7.5° for the third subsection (e.g. with 3.75° between the second and third subsections), 11.25° for the fourth subsection (e.g. with 3.75° between the third and fourth subsections), and 15° for the fifth subsection (e.g. with 3.75° between the fourth and fifth subsections). As shown in FIG. 13A, the subsection hubs 1208*a-e* (e.g. with skew described above) can be inserted (e.g. slid, with interacting key and keyway allowing axial movement, but fixing rotational movement/location) over a mandrel 1301 (e.g. which may have the corresponding key or keyway for the hubs 1208), for example with the location of the rotational connection mechanism 821 (e.g. key or keyway) on the hubs 1208 providing skew. Typically, the hubs 1208 of the set of subsections 1205 forming the rotor module 405 may all be contacting (e.g. each contacting one or more adjacent hubs 1208), with nothing disposed therebetween. For example, there typically would not be a bearing disposed between subsections 1205 forming a rotor module 405, while there typically may be a bearing disposed between adjacent rotor modules 405 forming a rotor assembly 215 (e.g. all on a single shaft 220). The hubs 1208 of the set of subsections 1205 forming the rotor module 405 may jointly serve conceptually as the carrier 818 of the rotor module 405, but with the carrier 818 having integral skew. Each of the hubs 1208 may be solid elements with a bore therethrough and a rotational connection mechanism 821 disposed in the bore (e.g. similar to the carrier 818 of FIG. 8). In other embodiments, a single carrier 818 with different exterior surface magnet locations (e.g. magnet orientation surfaces, which can be skewed relative to one another) may be used in place of the plurality of hubs (for example, FIG. 13A could use a single integrated hub/carrier 818 without divisions but which provides the same exterior surface positions for magnet placement to accomplish the desired skew).

Once the hubs 1208 of all of the subsections 1205 forming the rotor module are in place on the mandrel 1301, the corresponding magnets 713 (e.g. magnet subsections, which each are sized with an axially length less than the module itself, for example a portion of the axial length of the module based on the number of subsections desired and/or the amount of skew desired) for each subsection 1205 can be placed on the hub 1208 (e.g. with the hubs 1208 orienting the magnets 713 to provide the desired skew). Thus, the rotor module 405 may be formed of a plurality of shorter magnets 713. See for example, FIG. 13B. FIG. 13C illustrates schematically the skew of the sets of magnets of the different subsections assembled as in FIG. 13B. Once the magnets 713 are in place on their respective hubs 1208, a sleeve 1330 can be inserted over the rotor module subsections 1205, holding the magnets 713 in place on their respective hubs 1208 and holding the subsections 1205 together axially to form an integral rotor module 405 with inherent skew. See for example FIG. 13D, in which a single sleeve 1330 axially spans all of the subsections 1205 forming the rotor module 405. The subsections 1205 of the rotor module 405 may be directly coupled together (e.g. rotationally coupled to the shaft 220 and axially held in contact), for example to form an integrated rotor module 405.

Figure 13E:
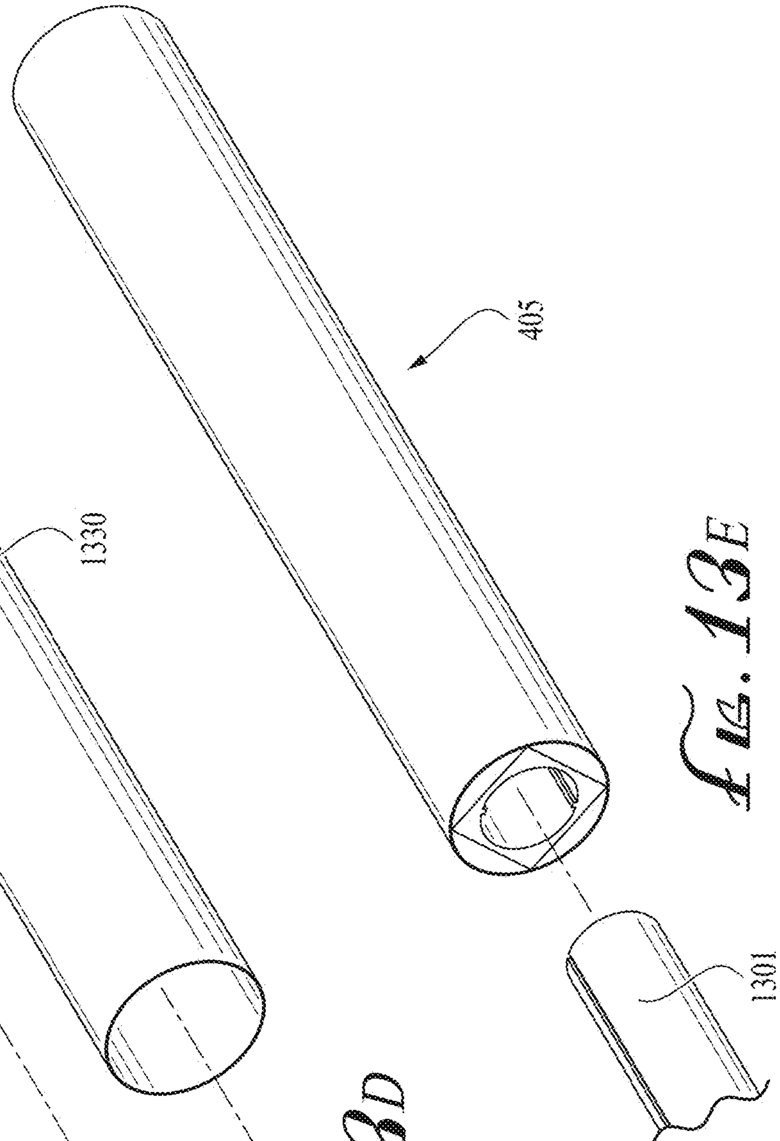
Figure 14:
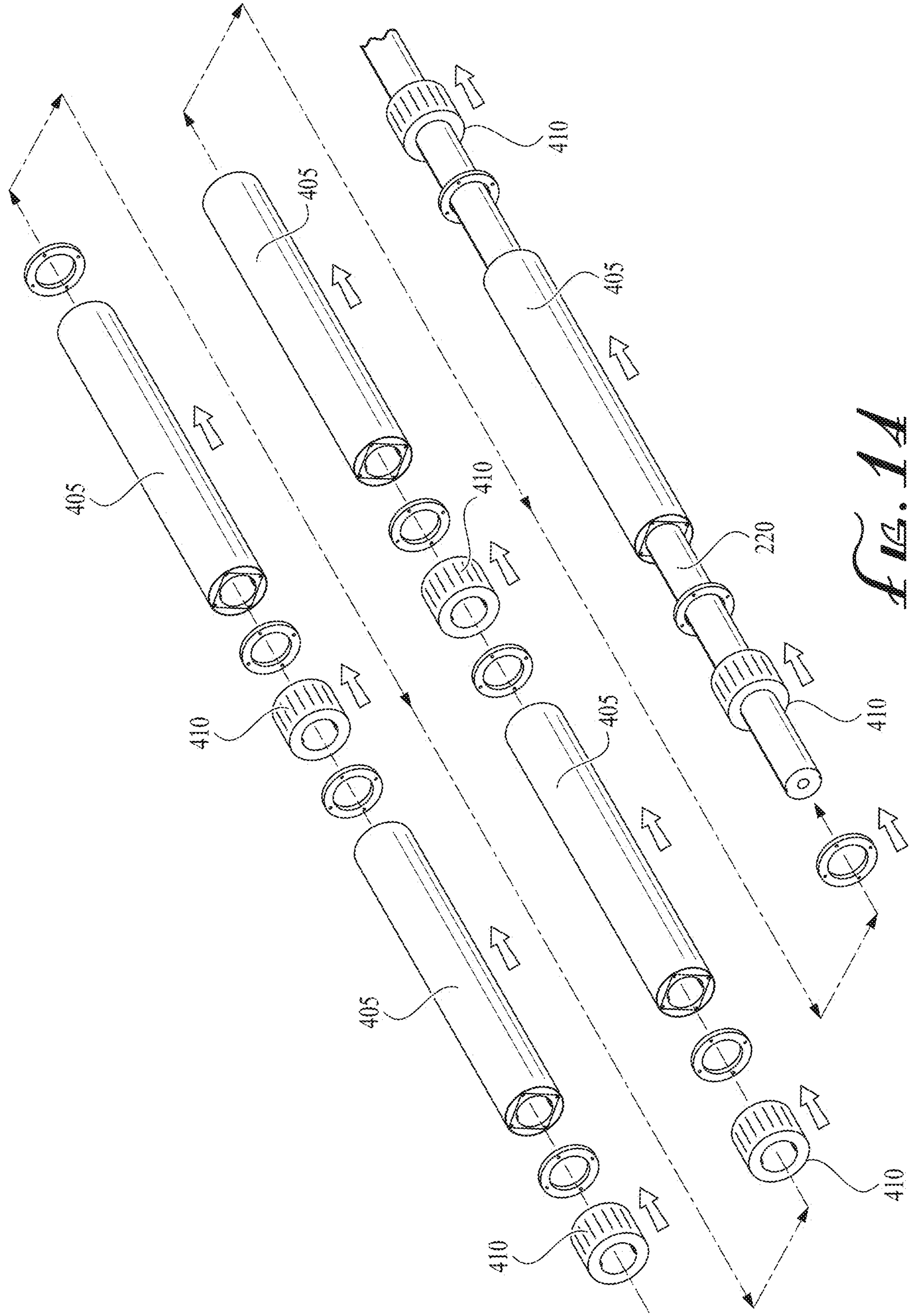
FIG. 14 illustrates an exemplary method using a plurality of rotor modules similar to FIG. 13E to form a rotor assembly, according to an embodiment of the disclosure.

As shown in FIG. 13E, the formed rotor module 405 may be removed (e.g. slid) from the assembly mandrel 1301, and the sleeve 1330 may hold the rotor module 405 together as an integrated whole. While skewing is illustrated in FIGS. 13A-E with respect to surface mount rotor module subsections and/or breadloaf magnets 713, the same skewing approach may be similarly used for other subsection types (e.g. internally mounted magnets 713) and/or other magnet shapes. One or more such rotor module 405 (e.g. formed of subsections and/or having integral skew) may be placed on the shaft 220 (e.g. with bearings disposed therebetween in some embodiments) to form the rotor assembly 215 of a motor (e.g. for an ESP), as shown in in FIG. 14 for example. In some embodiments, each skewed rotor module 405 may be formed in a similar manner to the skewed rotor assembly (e.g. of FIGS. 10-11C), for example with the subsections serving in place of the rotor modules (although typically, for skewed rotor modules, a single sleeve 1330 would cover all of the subsections). In some embodiments, due to the inherent skew of the rotor modules 405 formed using skewed subsections 1205, the rotor modules 405 forming the rotor assembly 215 may not be skewed relative to one another. In other embodiments, one or more (e.g. in some embodiments all) of the rotor modules 405 may also be skewed (for example with the rotor assembly 215 using both inherent inter-module skewing (e.g. similar to that discussed with respect to FIGS. 12A-13D) and module-level skewing (e.g. similar to that discussed with respect to FIGS. 10-11C)). Typically, the portion of the rotational connection mechanism 821 (e.g. the key or keyway) on the shaft 220 may extend substantially the length of the shaft 220 (e.g. a straight axially extending element on the shaft 220, with the skew accomplished based on the location of the corresponding element on the carriers 818 of the rotor modules).

Providing skew to rotor assemblies for ESP motors can enhance performance and/or compensate for shaft torsion under load conditions. And, using a modular approach to provide skew can greatly simplify the skewing process, improving manufacture and assembly of rotor assemblies and/or minimizing impact relating to handling of large magnetized assemblies, as well as the attractive forces involved in their handling. These and other benefits may be provided by disclosed embodiments and/or will be apparent to persons of skill in light of this disclosure.

Additional Disclosure

The following are non-limiting, specific embodiments in accordance with the present disclosure:

In a first embodiment, a rotor assembly (e.g. configured to be concentrically disposed on a drive shaft for an ESP motor) can comprise: a plurality of rotor modules, each configured to be disposed about the shaft (e.g. axially stacked on the shaft) and each comprising a plurality of permanent magnets (e.g. disposed around the shaft, for example with equal spacing therebetween) (e.g. for a four pole motor design, four magnets) and a rotational connection mechanism configured to rotationally couple the rotor module to the shaft (e.g. so the rotor module and the shaft rotate together) (typically while allowing for axial movement, for example for sliding installation of the rotor module onto the shaft); wherein each rotor module is skewed (e.g. rotationally/angularly shifted) with respect to one or more other of the plurality of rotor modules (e.g. in some embodiments each rotor module is skewed with respect to the remaining rotor modules and/or all of the plurality of rotor modules are skewed with respect to each other).

A second embodiment can include the rotor assembly of the first embodiment, wherein skewing of rotor modules comprises angular displacement of the corresponding magnets (e.g. of one rotor module with respect to another rotor module).

A third embodiment can include the rotor assembly of the first or second embodiment, wherein an amount of skew for the entire rotor assembly (rotor assembly skew or "RAS") comprises 360 degrees divided by the number of stator slots, with the result then being multiplied by one or two (e.g. based on the desired slot pitch for the rotor assembly) (e.g. determined using the formula $$RAS = n \cdot \frac{360}{N_S},$$

where: n is the skew in stator slots (typically 1 or 2) and $N_S$ is the number of stator slots).

A fourth embodiment can include the rotor assembly of the third embodiment, wherein an amount of skew for individual rotor modules of the rotor assembly (e.g. amount of skew/angular displacement with respect to other rotor modules of the rotor assembly and/or amount of skew/angular displacement between rotor modules—"ASBRM") comprises the amount of skew for the entire rotor assembly (e.g. rotor assembly skew or "RAS") divided by one less than the number of rotor modules within the rotor assembly (e.g. the formula for determining the amount of angular displacement between rotor modules can be $$ASBRM = n \cdot \frac{360}{N_S \cdot (N_m - 1)},$$

where: n is the skew in stator slots (typically 1 or 2), $N_S$ is the number of stator slots, and $N_m$ is the number of rotor modules) (e.g, wherein each rotor module is skewed the ASBRM with respect to another one of the plurality of rotor modules, and/or wherein each rotor module of the plurality of rotor modules is rotationally positioned with respect to another one of the plurality of rotor modules, with the amount of rotational angle equaling the amount of skew for individual rotor modules).

A fifth embodiment can include the rotor assembly of the fourth embodiment, wherein each rotor module of the plurality of rotor modules is skewed the amount of skew for individual rotor modules with respect to another one of the plurality of rotor modules (e.g. and none of the rotor modules of the plurality of rotor modules have the same skew, for example with respect to a fixed point/line) (e.g. each rotor module is cocked at a different angle around the shaft—e.g. relative to a fixed point).

A sixth embodiment can include the rotor assembly of any one of the first to fifth embodiments, wherein the amount of skew (e.g. angular displacement between rotor modules) is approximately 3.75 degrees (e.g. for a 24 stator slot motor).

A seventh embodiment can include the rotor assembly of any one of the first to sixth embodiments, wherein the rotational connection mechanism for each rotor module is configured to extend axially substantially an entire longitudinal/axial length of the rotor module.

An eighth embodiment can include the rotor assembly of any one of the first to seventh embodiments, wherein torque is transmitted from the rotor module to the shaft along substantially the entire length of the rotor module (e.g. due to interaction of the elements/portions of the rotational connection mechanism of the shaft and the rotor module).

A ninth embodiment can include the rotor assembly of any one of the first to eighth embodiments, wherein the rotational connection mechanism comprises two (e.g. corresponding) portions, a first portion on the rotor module and a second portion on the shaft.

A tenth embodiment can include the rotor assembly of the ninth embodiment, wherein the first portion extends axially substantially the length of the rotor module and/or the second portion extends axially substantially the length of the shaft.

An eleventh embodiment can include the rotor assembly of any one of the first to tenth embodiments, wherein the rotational connection mechanism comprises a key and a corresponding keyway (e.g. configured to allow axial sliding with respect to each other but to rotationally fix the key and the keyway) (e.g, wherein the first portion is either a key or a keyway/slot, and the second portion is the other/corresponding keyway or key).

A twelfth embodiment can include the rotor assembly of any one of the first to eleventh embodiments, wherein each rotor module further comprising a magnetic carrier configured to be disposed about the shaft and to provide for placement of the magnets around the shaft (e.g. the location of the magnets for each rotor module around the shaft are determined based on the carrier, for example with magnet placement pads disposed on the exterior surface of the carrier).

A thirteenth embodiment can include the rotor assembly of the twelfth embodiment, wherein the skew of the plurality of rotor modules is determined by skew of the corresponding carriers (e.g, wherein the carriers of the plurality of rotor modules are skewed relative to one another, which can skew the angular position of the magnets of each rotor module with respect to the magnets of other rotor modules).

A fourteenth embodiment can include the rotor assembly of any one of the twelfth or thirteenth embodiments, wherein the rotational connection mechanism skews the carriers of the plurality of rotor modules.

A fifteenth embodiment can include the rotor assembly of any one of the twelfth to fourteenth embodiments, wherein the first portion of the rotational connection mechanism for each rotor module is disposed on the corresponding carrier (e.g. on the bore of the carrier).

A sixteenth embodiment can include the rotor assembly of any one of the ninth to fifteenth embodiments, wherein the first portion of the rotational connection mechanism of each rotor module is skewed with respect to that of the other rotor modules of the set/plurality of rotor modules forming the rotor assembly (e.g. the amount of angular displacement between the key/keyway and the magnets differs for each rotor module).

A seventeenth embodiment can include the rotor assembly of any one of the twelfth to sixteenth embodiments, wherein the carrier of each rotor module is a solid element with a bore (e.g. no laminations and/or no pockets).

An eighteenth embodiment can include the rotor assembly of any one of the twelfth to seventeenth embodiments, wherein the magnets of each rotor module are disposed on the external surface of the carrier (e.g. surface mounted on the carrier) (e.g. not held in pockets within the carrier).

A nineteenth embodiment can include the rotor assembly of any one of the twelfth to eighteenth embodiments, wherein each rotor module further comprises an outer sleeve configured to retain the magnets to the corresponding carrier (e.g. with the sleeve disposed concentrically around the magnets and the carrier and/or with the interior surface of the sleeve contacting the magnets).

A twentieth embodiment can include the rotor assembly of the nineteenth embodiment, wherein the sleeve comprises or is composed of non-magnetic material (e.g. carbon fiber or Inconel or stainless steel).

A twenty-first embodiment can include the rotor assembly of any one of the first to twentieth embodiments, wherein each rotor module has a length of approximately 340-460 mm.

A twenty-second embodiment can include the rotor assembly of any one of the twelfth to twenty-first embodiments, wherein the carrier for each rotor module does not include laminations.

A twenty-third embodiment can include the rotor assembly of any one of the twelfth to twenty-second embodiments, wherein each carrier comprises an extension at each end configured to support an end ring (e.g, wherein each extension has a diameter less than that of the remainder of the carrier).

A twenty-fourth embodiment can include the rotor assembly of any one of the twelfth to twenty-third embodiments, wherein each carrier comprises or is composed of magnetic material (e.g. such as carbon steel).

A twenty-fifth embodiment can include the rotor assembly of any one of the first to twenty-fourth embodiments, wherein the plurality of rotor modules comprises five or more rotor modules (e.g. five or ten or 5-10 or 5-15 or 10-15 or 5-20 or 10-20 or 15-20).

A twenty-sixth embodiment can include the rotor assembly of any one of the first to twenty-fifth embodiments, further comprising a plurality of bearings, each disposed between adjacent rotor modules (e.g. the plurality of rotor modules may be axially stacked on the shaft with a bearing disposed between adjacent rotor modules).

A twenty-seventh embodiment can include the rotor assembly of the twenty-sixth embodiment, wherein each bearing is not connected to (e.g. free to rotate with respect to) the shaft or any rotor module.

A twenty-eighth embodiment can include the rotor assembly of any one of the first to twenty-seventh embodiments, wherein the plurality of rotor modules are not directly connected together (e.g. each rotor module is only rotationally connected to the shaft and/or are only rotationally coupled together, for example via attachment to the shaft).

A twenty-ninth embodiment can include the rotor assembly of any one of the twelfth to twenty-eighth embodiments, wherein, for each rotor module, the plurality of magnets are surface mounted to the carrier.

A thirtieth embodiment can include the rotor assembly of any one of the first to twenty-ninth embodiments, wherein the plurality of magnets are breadloaf in shape (e.g. with curved exterior surface which may match curvature of the interior surface of the outer sleeve).

A thirty-first embodiment can include the rotor assembly of any one of the twelfth to thirtieth embodiments, wherein, for each of the plurality of rotor modules, the carrier and each of the magnets are approximately the same axial length (e.g. extending substantially the full axial length of the rotor module).

A thirty-second embodiment can include the rotor assembly of any one of the first to thirty-first embodiments, wherein the plurality of rotor modules are assembled (e.g. stacked) on the shaft in sequence based on skew (e.g. with each adjacent pair of rotor modules having the same skew/angular displacement therebetween).

A thirty-third embodiment can include the rotor assembly of any one of the first to thirty-first embodiments, wherein the plurality of modules are not assembled (e.g. stacked) on the shaft in sequence based on skew (e.g, wherein one or more adjacent pair of rotor modules do not have the same skew/angular displacement therebetween as one or more other adjacent pair of rotor modules of the rotor assembly) (e.g. the skew between adjacent rotor modules may vary).

In a thirty-fourth embodiment, a rotor module (e.g. configured to be concentrically disposed on a drive shaft for an ESP motor) can comprise: a plurality of rotor module subsections, each configured to be disposed about the shaft (e.g. axially stacked on the shaft) and each comprising a plurality of permanent magnets (e.g. disposed around the shaft, for example with equal angular spacing therebetween); wherein each rotor module subsection is skewed (e.g. rotationally/angularly shifted/displaced) with respect to one or more other of the plurality of subsections (e.g. in some embodiments each rotor module subsection is skewed with respect to the remaining subsections and/or all of the plurality of rotor module subsections are skewed with respect to each other) and coupled together to form a rotor module having inherent skew (e.g. along its length).

A thirty-fifth embodiment can include the rotor module of the thirty-fourth embodiment, wherein skewing of rotor module subsections comprises angular displacement of the corresponding magnets (e.g. of one subsection with respect to another subsection).

A thirty-sixth embodiment can include the rotor module of any one of the thirty-fourth to thirty-fifth embodiments, wherein each subsection further comprises a hub (which in some embodiments can be similar to the carrier of one of the twelfth to thirty-first embodiments, for example solid, non-laminated with a bore) configured to be disposed on the shaft and to position the corresponding plurality of magnets around the shaft (e.g. which positions the corresponding magnets of each subsection, providing skew to the magnets (e.g. the magnets at different axial locations are skewed relative to the magnets at other axial positions)) (e.g. the location of the magnets for the rotor module around the shaft are determined based on the hub, for example with magnet placement pads disposed on the exterior surface of the hub).

A thirty-seventh embodiment can include the rotor module of the thirty-sixth embodiment, wherein the hub comprises or is composed of magnetic material.

A thirty-eight embodiment can include the rotor module of any one of the thirty-sixth to thirty-seventh embodiments, wherein the magnets (e.g. which may be broadloaf in shape) of each subsection are surface mounted on the corresponding hub.

A thirty-ninth embodiment can include the rotor module of any one of the thirty-sixth to thirty-eighth embodiments, wherein the skew of the plurality of rotor module subsections is determined by skew of the corresponding hubs (e.g, wherein the magnetic hubs of the plurality of subsections are skewed relative to one another, and this positions the corresponding magnets with skew).

A fortieth embodiment can include the rotor module of any one of the thirty-fourth to thirty-ninth embodiments, wherein an amount of inherent skew for the entire rotor module comprises 360 degrees divided by the number of stator slots, and then multiplied by typically one or two (e.g. based on desired slot pitch) (e.g. determined using the formula $$\text{Inherent Skew} = n \cdot \frac{360}{N_S},$$

where: n is the skew in stator slots (typically 1 or 2) and $N_S$ is the number of stator slots).

A forty-first embodiment can include the rotor module of the fortieth embodiment, wherein an amount of skew between subsections ("ASBS") within the rotor module comprises the amount of inherent skew for the entire rotor module divided by the number of subsections reduced by one (i.e. ASBS comprises the amount of inherent skew for the entire rotor module divided by one less than the number of subsections within the rotor module) (e.g. the formula for determining the amount of skew between subsections can be $$ASBS = n \cdot \frac{360}{N_S \cdot (N_m - 1)},$$

where: n is the skew in stator slots (typically 1 or 2), $N_S$ is the number of stator slots, and $N_m$ is the number of subsections in the rotor module).

A forty-second embodiment can include the rotor module of the forty-first embodiment, wherein each rotor module subsection is skewed ASBS with respect to another one of the plurality of subsections (e.g. and none of the rotor module subsections have the same skew, for example with respect to a fixed point/line) (e.g. each subsection is cocked at a different angle around the shaft).

A forty-third embodiment can include the rotor module of any one of the thirty-fourth to forty-second embodiments, wherein the amount of skew (e.g. angular displacement between rotor module subsections) is approximately 3.75 degrees (e.g. for a 24 stator slot motor).

A forty-fourth embodiment can include the rotor module of any one of the thirty-fourth to forty-third embodiments, wherein the plurality of subsections (e.g. their hubs) are stacked (e.g. on the shaft), for example in contact with one another (e.g. with bores aligned) (e.g. in some embodiments, the plurality of subsections can be assembled/stacked on the shaft in sequence based on skew (e.g. with each adjacent pair of subsections having the same skew/angular displacement therebetween), while in other embodiments the plurality of modules are not assembled on the shaft in sequence based on skew (e.g, wherein one or more adjacent pair of subsections do not have the same skew/angular displacement therebetween as one or more other adjacent pair of subsections of the rotor module)).

A forty-fifth embodiment can include the rotor module of any one of the thirty-fourth to forty-fourth embodiments, further comprising a carrier with axial length approximately equal to the entire rotor module and having external orientation surfaces (e.g. magnet placement pads) configured to position the magnets of the plurality of subsections with skew (e.g. the magnets at one axial location (e.g. corresponding to one subsection) on the carrier can be skewed with respect to the magnets at another axial location (corresponding to another subsection) on the carrier (e.g. essentially, the set of magnets at each axial location form the corresponding subsection on the carrier) (e.g. essentially the hubs of the various subsections are joined together to form a single carrier element).

A forty-sixth embodiment can include the rotor module of any one of the thirty-fourth to forty-fifth embodiments, further comprising a single outer sleeve disposed around the plurality of subsections, wherein the sleeve extends axially substantially a length of the rotor module (e.g. the combined axial length of all of the stacked subsections), wherein the sleeve holds the magnets of each subsection onto the corresponding hub (e.g. retaining the position of the magnets for each subsection), and wherein the sleeve holds the plurality of subsections together (e.g. as a single, integral unit).

A forty-seventh embodiment can include the rotor module of the forty-sixth embodiment, wherein the sleeve comprises or is composed of non-magnetic material (e.g. carbon fiber or Inconel or stainless steel).

A forty-eighth embodiment can include the rotor module of any one of the thirty-fourth to forty-seventh embodiments, wherein each subsection further comprises a rotational connection mechanism configured to rotationally couple the rotor module subsection to the shaft (e.g. so the rotor subsection and the shaft rotate together) (typically while allowing for axial movement, for example for sliding installation of the rotor module onto the shaft).

A forty-ninth embodiment can include the rotor module of the forty-eighth embodiment, wherein the rotational connection mechanism of each subsection is configured to extend axially substantially an entire longitudinal/axial length of the subsection.

A fiftieth embodiment can include the rotor module of any one of the forty-eighth to forty-ninth embodiments, wherein the rotational connection mechanism comprises two (e.g. corresponding) portions, a first portion on the rotor module subsection and a second portion of the shaft.

A fifty-first embodiment can include the rotor module of the fiftieth embodiment, wherein the first portion extends axially substantially the length of the subsection and/or the second portion extends axially substantially the length of the shaft.

A fifty-second embodiment can include the rotor module of any one of the fiftieth to fifty-first embodiments, wherein the first portion of all of the plurality of rotor module subsections (e.g. of the set of subsections jointly forming the rotor module) are axially aligned (e.g. when the subsections are coupled together, to allow for sliding of the rotor module onto the shaft).

A fifty-third embodiment can include the rotor module of any one of the fiftieth to fifty-second embodiments, wherein the first portion comprises a key or keyway (e.g. slot) and/or the second portion comprises the corresponding keyway or key.

A fifty-fourth embodiment can include the rotor module of any one of the fiftieth to fifty-third embodiments, wherein the first portion is disposed on the hub (e.g. on the bore of the hub) for each corresponding subsection.

A fifty-fifth embodiment can include the rotor module of any one of the forty-eighth to fifty-fourth embodiments, wherein the rotational connection mechanism for each subsection comprises a key and a corresponding keyway (e.g. configured to allow axial sliding with respect to each other but to rotationally fix the key and the keyway) (e.g, wherein the first portion is either a key or a keyway/slot, and the second portion is the other/corresponding keyway or key).

A fifty-sixth embodiment can include the rotor module of any one of the thirty-sixth to fifty-fifth embodiments, wherein the hub of each subsection comprises either a key or keyway (e.g. slot) (e.g. on the bore of the hub) corresponding to a keyway or key on the shaft (e.g, wherein the hub of each subsection comprises a portion of a keyed rotational connection mechanism configured to interact with a second portion of the keyed rotational connection mechanism disposed on the shaft).

A fifty-seventh embodiment can include the rotor module of any one of the fiftieth to fifty-sixth embodiments, wherein the first portion of the rotational connection mechanism of each subsection is skewed with respect to that of the other subsections of the set/plurality of subsections forming the rotor module (e.g. the amount of angular displacement between the key/keyway and the magnets differs for each subsection).

A fifty-eighth embodiment can include the rotor module of any one of the thirty-fourth to fifty-seventh embodiments, wherein each rotor module subsection has a length of approximately 68-92 mm or 70-90 mm and/or the rotor module has a length of approximately 340-460 mm.

A fifty-ninth embodiment can include the rotor module of any one of the thirty-fourth to fifty-eighth embodiments, wherein each rotor module comprises five or more subsections (e.g. five or ten or 5-10 or 5-15 or 10-15 or 5-20 or 10-20 or 15-20).

In a sixtieth embodiment, a rotor assembly can comprise a plurality of rotor modules, each according to any one of the thirty-fourth to fifty-ninth embodiments, disposed on a shaft.

A sixty-first embodiment can include the rotor assembly of the sixtieth embodiment, wherein each rotor module is skewed (e.g. rotationally/angularly shifted) with respect to one or more other of the plurality of rotor modules (e.g. in some embodiments each rotor module is skewed with respect to the remaining rotor modules and/or all of the plurality of rotor modules are skewed with respect to each other) (e.g. similar to the first to thirty-third embodiments, but using one or more rotor module with inherent skew).

A sixty-second embodiment can include the rotor assembly of the sixtieth embodiment, wherein the rotor modules are not skewed (e.g, wherein the only skew for the rotor assembly comes from inherent skew of one or more rotor module).

A sixty-third embodiment can include the rotor assembly of any one of the sixtieth to sixty-second embodiments, wherein a bearing is disposed between adjacent rotor modules (e.g, wherein the rotor assembly is similar to any one of the first to thirty-third embodiments, but includes inherently skewed rotor modules).

In a sixty-fourth embodiment, an ESP assembly (e.g. for use downhole in a well) can comprise: a pump and a motor (e.g. configured to drive the pump, for example via shaft), wherein the motor can comprise: a shaft, a rotor assembly according to any one of the first to thirty-third embodiments or sixtieth to sixty-third embodiments, and a stator, wherein the rotor assembly is rotationally fixed (e.g. concentrically) about the shaft, and the stator is disposed (e.g. concentrically) around the rotor assembly.

A sixty-fifth embodiment can include the rotor assembly of the sixty-fourth embodiment, wherein the shaft, stator, and/or rotor assembly are approximately a same axial length (e.g. a single shaft and/or a single, unitary stator, which may encompass the entire rotor assembly).

In a sixth-sixth embodiment, a method of forming a rotor module can comprise: disposing (e.g. axially stacking, with each subsection hub contacting one or more other hub) a plurality of magnetic hubs (e.g. of rotor module subsections) on a mandrel, wherein the mandrel and the hubs are configured with a rotational connection mechanism (e.g. complementary portions) and wherein each of the hubs is skewed; disposing a plurality of permanent magnets on each hub (e.g, wherein the hub is configured to position the magnets around the shaft, for example to form a plurality of subsections); disposing a single sleeve around the plurality of subsections (e.g. hubs and magnets) (e.g, wherein the sleeve has an axial length approximately equal to the overall axial length of the rotor module), wherein the sleeve is configured to hold the magnets onto the corresponding hub and to couple the subsections together (e.g. axially) into a unitary rotor module; wherein the rotor module has inherent or integral skew (e.g. with the rotor module being selected from any one of the thirty-fourth to fifty-ninth embodiments).

A sixty-seventh embodiment can include the method of the sixty-sixth embodiment, wherein the magnets of each subsection are surface mounted to the corresponding hub.

A sixty-eighth embodiment can include the method of any one of the sixty-sixth to sixty-seventh embodiments, further comprising press-fitting the sleeve to join the magnets and the hubs together into a unitary rotor module.

A sixty-ninth embodiment can include the method of any one of the sixty-sixth to sixty-eighth embodiments, further comprising providing a set of hubs configured with a desired skew for the rotor module (e.g, wherein the set of hubs jointly provide the inherent skew of the rotor module, orienting the corresponding magnets with skew).

A seventieth embodiment can include the method of any one of the sixty-sixth to sixty-ninth embodiments, wherein an angular location of a key or keyway (or other rotational connection mechanism) on each hub provides skew (e.g. the angular location of the key or keyway differs for each hub of the rotor module, altering the location of the magnets of each subsection with respect to the other subsections) (e.g. the amount of angular displacement between the key/keyway and the magnets differs for each subsection of the rotor module).

A seventy-first embodiment can include the method of any one of the sixty-sixth to seventieth embodiments, wherein there are no bearings disposed between subsections (e.g. the subsections are stacked in contact and/or axially contact with no axial space therebetween).

A seventy-second embodiment can include the method of any one of the sixty-sixth to seventy-first embodiments, further comprising removing the rotor module from the mandrel (e.g. by sliding it off), wherein the rotor module holds its shape as an integrated unit (e.g. without any need for centralized support in its bore) (e.g, wherein the rotor module is similar to any one of the thirty-fourth to fifty-ninth embodiments).

A seventy-third embodiment can include the method of any one of the seventieth to seventy-second embodiments, wherein the key or keyway of each hub extends substantially an entire length of the corresponding hub.

A seventy-fourth embodiment can include the method of the seventy-third embodiment, wherein the key or keyway of all stacked hubs of the rotor module are aligned and jointly extend axially substantially an entire axial length of the rotor module.

In a seventy-fifth embodiment, a method of forming a rotor assembly can comprise: providing a plurality of rotor modules; and disposing (e.g. sliding) the plurality of rotor modules onto a shaft, wherein the plurality of rotor modules are configured to rotate with the shaft.

A seventy-sixth embodiment can include the method of the seventy-fifth embodiment, further comprising disposing (e.g. sliding) a plurality of bearings onto the shaft, wherein one of the bearings is located between adjacent rotor modules (and are not connected to the rotor modules or the shaft).

A seventy-seventh embodiment can include the method of any one of the seventy-fifth to seventy-sixth embodiments, wherein each rotor module is skewed (e.g. rotationally/angularly shifted) with respect to one or more other of the plurality of rotor modules (e.g. in some embodiments each rotor module is skewed with respect to the remaining rotor modules and/or all of the plurality of rotor modules are skewed with respect to each other).

A seventy-eighth embodiment can include the method of any one of the seventy-fifth to seventy-seventh embodiments, wherein the rotor assembly comprises any one of the first to thirty-third embodiments or sixtieth to sixty-third embodiments.

A seventy-ninth embodiment can include the method of any one of the seventy-fifth to seventy-eighth embodiments, wherein each of the rotor modules is inherently skewed.

An eightieth embodiment can include the method of the seventy-ninth embodiment, wherein providing a plurality of rotor modules comprises forming the plurality of rotor modules (e.g. each with a plurality of subsections) according to any one of the sixty-sixth to seventy-fourth embodiments.

An eighty-first embodiment can include the method of any one of the seventy-fifth to eightieth embodiments, wherein each of the rotor modules comprises one of the thirty-fourth to fifty-ninth embodiments.

In an eighty-second embodiment, a system comprising the ESP assembly of any one of the sixty-fourth to sixty-fifth embodiments disposed downhole in a well.

In an eighty-third embodiment, a method of operating an ESP assembly (e.g. similar to the sixty-fourth or sixty-fifth embodiments above), comprising: using the method of any one of the seventy-fifth to eighty-first embodiments to form a rotor assembly; disposing a stator concentrically around the plurality of rotor modules; coupling the drive shaft to a pump to form the ESP assembly; electrically connecting the stator and/or rotor to a power source for operation of the motor; disposing the ESP assembly downhole in a well; and/or using the ESP assembly to pump fluid uphole (e.g. towards the surface).

So, several improved embodiments relating to rotors for electrical motors are disclosed. For example, a rotor assembly for an ESP motor can include a plurality of rotor modules, each configured to be disposed about and rotationally coupled to a drive shaft and each comprising a plurality of permanent magnets, with each rotor module being skewed with respect to one or more other of the plurality of rotor modules. Another exemplary approach for providing skew may be using a rotor module having a plurality of rotor module subsections, each configured to be disposed about a drive shaft and each comprising a plurality of permanent magnets, with each rotor module subsection being skewed with respect to one or more other of the plurality of subsections and coupled together to form a rotor module having inherent skew. In some embodiments, inherently skewed rotor modules may also be skewed with respect to one another (which may provide further skew enhancement and/or benefit), while other exemplary embodiments may include rotor assemblies in which inherently skewed rotor modules are used but without any skew between rotor modules (e.g. such that the skew for the rotor assembly can be entirely provided by the inherent skew of the modules). These and other related embodiments, including related method and system embodiments, will be understood by persons of skill based on the disclosure herein, and are fully included within the scope of this specification.

While embodiments have been shown and described, modifications thereof can be made by one skilled in the art without departing from the spirit and teachings of this disclosure. The embodiments described herein are exemplary only and are not intended to be limiting. Many variations and modifications of the embodiments disclosed herein are possible and are within the scope of this disclosure. For example, the various elements or components may be combined or integrated in another system or certain features may be omitted or not implemented. Also, techniques, systems, subsystems, and methods described and illustrated in the various embodiments as discrete or separate may be combined or integrated with other techniques, systems, subsystems, or methods without departing from the scope of this disclosure. Other items shown or discussed as directly coupled or connected or communicating with each other may be indirectly coupled, connected, or communicated with. Method or process steps set forth may be performed in a different order. The use of terms, such as "first," "second," "third" or "fourth" to describe various processes or structures is only used as a shorthand reference to such steps/structures and does not necessarily imply that such steps/structures are performed/formed in that ordered sequence (unless such requirement is clearly stated explicitly in the specification).

Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, 50 percent, 51 percent, 52 percent, 95 percent, 96 percent, 97 percent, 98 percent, 99 percent, or 100 percent. Moreover, any numerical range defined by two R numbers as defined in the above is also specifically disclosed. Language of degree used herein, such as "approximately," "about," "generally," and "substantially," represent a value, amount, or characteristic close to the stated value, amount, or characteristic that still performs a desired function or achieves a desired result. For example, the language of degree may mean a range of values as understood by a person of skill or, otherwise, an amount that is +/−10%.

Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded. The use of the terms such as "high-pressure" and "low-pressure" is intended to only be descriptive of the component and their position within the systems disclosed herein. That is, the use of such terms should not be understood to imply that there is a specific operating pressure or pressure rating for such components. For example, the term "high-pressure" describing a manifold should be understood to refer to a manifold that receives pressurized fluid that has been discharged from a pump irrespective of the actual pressure of the fluid as it leaves the pump or enters the manifold. Similarly, the term "low-pressure" describing a manifold should be understood to refer to a manifold that receives fluid and supplies that fluid to the suction side of the pump irrespective of the actual pressure of the fluid within the low-pressure manifold.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

As used herein, the term "and/or" includes any combination of the elements associated with the "and/or" term. Thus, the phrase "A, B, and/or C" includes any of A alone, B alone, C alone, A and B together, B and C together, A and C together, or A, B, and C together.

What is claimed is:

1. A rotor assembly configured to be concentrically disposed on a drive shaft for an ESP motor, comprising:

a plurality of rotor modules, each configured to be disposed about the shaft and each comprising a plurality of permanent magnets and a rotational connection mechanism configured to rotationally couple the rotor module to the shaft;

wherein all of the plurality of rotor modules are skewed with respect to each other; and wherein an amount of skew for the entire rotor assembly comprises 360 degrees divided by a number of stator slots, and then multiplied by one or two.

2. The rotor assembly of claim 1, wherein each rotor module further comprises a magnetic carrier configured to be disposed about the shaft and to provide for placement of the magnets around the shaft.

3. The rotor assembly of claim 1, wherein an amount of skew between rotor modules ("ASBRM") within the rotor assembly comprises the amount of skew for the entire rotor assembly divided by the number of rotor modules reduced by one, and wherein each rotor module of the plurality of rotor modules is skewed ASBRM with respect to another one of the plurality of rotor modules.

4. The rotor assembly of claim 1, wherein the rotational connection mechanism comprises two corresponding portions, a first portion on the rotor module and a second portion on the shaft, and wherein the first portion extends axially substantially a length of the rotor module.

5. The rotor assembly of claim 4, wherein:

each rotor module further comprises a magnetic carrier configured to be disposed about the shaft and to provide for placement of the magnets around the shaft;

the first portion of the rotational connection mechanism for each rotor module is disposed on the corresponding carrier; and for each rotor module, the plurality of magnets are surface mounted to the corresponding carrier.

6. The rotor assembly of claim 5, wherein each rotor module further comprises an outer sleeve configured to retain the magnets to the corresponding carrier.

7. The rotor assembly of claim 6, further comprising a plurality of bearings, each disposed between adjacent rotor modules, wherein each rotor module of the plurality of rotor modules is only rotationally connected to the shaft, with no coupling to other rotor modules of the plurality of rotor modules.

8. A rotor module configured to be concentrically disposed on a drive shaft for an ESP motor, comprising:

a plurality of rotor module subsections, each configured to be disposed about the shaft and each comprising a plurality of permanent magnets;

wherein each rotor module subsection is skewed with respect to one or more other of the plurality of subsections and coupled together to form the rotor module having inherent skew;

wherein the plurality of subsections are stacked in contact with one another; and wherein an amount of inherent skew for the entire rotor module comprises 360 degrees divided by a number of stator slots, and then multiplied by one or two.

9. The rotor module of claim 8, wherein each subsection further comprises a hub configured to be disposed on the shaft and to position the corresponding plurality of magnets around the shaft; and the magnets of each subsection are surface mounted on the corresponding hub.

10. The rotor module of claim 8, wherein an amount of skew between subsections ("ASBS") within the rotor module comprises the amount of inherent skew for the entire rotor module divided by the number of subsections reduced by one, and wherein each rotor module subsection is skewed ASBS with respect to another one of the plurality of subsections.

11. The rotor module of claim 9, further comprising a single outer sleeve disposed around the plurality of subsections, wherein:

the sleeve extends axially substantially a length of the rotor module, the sleeve holds the magnets of each subsection onto the corresponding hub, and the sleeve holds the plurality of subsections together as a single, integral rotor module unit.

12. The rotor module of claim 11, wherein each subsection further comprises a rotational connection mechanism configured to rotationally couple the rotor module subsection to the shaft.

13. The rotor module of claim 12, wherein:

the rotational connection mechanism comprises two corresponding portions, a first portion on the rotor module subsection and a second portion on the shaft;

the first portion for each subsection extends axially substantially the length of the corresponding subsection; and the first portions of all of the plurality of rotor module subsections of the rotor module are axially aligned.

14. The rotor module of claim 13, wherein the first portion of the rotational connection mechanism for each subsection comprises a key or keyway, the second portion comprises the corresponding keyway or key, and the first portion is disposed on the hub for each corresponding subsection.

15. The rotor module of claim 13, wherein the first portion of the rotational connection mechanism of each subsection is skewed with respect to that of the other subsections of the plurality of subsections forming the rotor module.

16. A method of forming a rotor assembly, comprising:

determining a number of stator slots for the rotor assembly:

determining a slot pitch for the rotor assembly:

determining an amount of skew for the entire rotor assembly by dividing 360 by the number of stator slots and multiplying by a factor based on the slot pitch;

providing a plurality of rotor modules; and disposing the plurality of rotor modules onto a shaft such that the plurality of rotor modules are configured to rotate with the shaft and each of the rotor modules is skewed such that the entire rotor assembly is skewed by the amount.

17. The method of claim 16, wherein each rotor module is also skewed with respect to one or more other of the plurality of rotor modules.

18. The method of claim 17, wherein providing a plurality of rotor modules comprises forming the plurality of rotor modules, wherein forming each rotor module comprises:

disposing a plurality of magnetic hubs on an assembly mandrel, wherein the mandrel and the hubs are configured with corresponding portions of a rotational connection mechanism and wherein each of the plurality of hubs is skewed with respect to one or more other of the plurality of hubs;

disposing a plurality of permanent magnets on each hub to form a plurality of subsections; and disposing a single sleeve around the plurality of subsections, wherein the sleeve is configured to hold the magnets onto the corresponding hub and to couple the subsections together into a unitary rotor module;

wherein each rotor module has inherent skew.

19. The method of claim 18, further comprising removing the rotor module from the assembly mandrel, wherein the rotor module holds its shape as an integrated unit.

20. The rotor module of claim 8, wherein the rotor module further comprises a magnetic carrier configured to be disposed about the shaft and to provide for placement of the magnets around the shaft.

21. The method of claim 16, wherein the factor is one or two.

* * * * *